United States Patent
Khoshnevisan et al.

(10) Patent No.: US 12,289,733 B2
(45) Date of Patent: Apr. 29, 2025

(54) VERIFYING RESOURCES ASSOCIATED WITH REPETITION-BASED LINKED DOWNLINK CONTROL CHANNEL CANDIDATES

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/574,289

(22) Filed: Jan. 12, 2022

(65) Prior Publication Data
US 2022/0303959 A1 Sep. 22, 2022

Related U.S. Application Data

(60) Provisional application No. 63/162,473, filed on Mar. 17, 2021.

(51) Int. Cl.
*H04L 1/18* (2023.01)
*H04L 5/00* (2006.01)
*H04W 72/23* (2023.01)

(52) U.S. Cl.
CPC ............... *H04W 72/23* (2023.01); *H04L 1/18* (2013.01); *H04L 5/0094* (2013.01)

(58) Field of Classification Search
CPC ....... H04L 1/18; H04L 1/1896; H04L 1/0072; H04L 5/0053; H04L 5/0094; H04L 1/0046; H04W 72/23
See application file for complete search history.

(56) References Cited

U.S. PATENT DOCUMENTS

2020/0196346 A1 6/2020 Khoshnevisan et al.
2022/0085931 A1* 3/2022 Mondal ............... H04W 72/044
(Continued)

OTHER PUBLICATIONS

3GPP TS 38.214: "3rd Generation Partnership Project, Technical Specification Group Radio Access Network, NR, Physical Layer Procedures for Data (Release 16)", DRAFT38214-G40, V16.4.0, (Dec. 2020), 3GPP, Mobile Competence Centre, 650, Route Des Lucioles, F-06921 Sophia-Antipolis Cedex, France, vol. RAN WG1, No. Jan. 8, 2021, 169 Pages, XP051999688, XP051967567, Retrieved from the Internet: URL: https://ftp.3gpp.org/Specs/archive/38_series/38.214/38214-g40.zip https://ftp.3gpp.org/Specs/archive/38_series/38.214/38214-g40.zip Draft38214-g40.docx, 38214-g40.docx [Retrieved on Jan. 8, 2021] Sections 6.1.1.2, 6.2.1 and 6.2.1.3. Section 5.2, Section 5.1.6.5, Section 6.2, Section 6.2.1, Section 5.2.1.5.1.

(Continued)

*Primary Examiner* — Anez C Ebrahim
(74) *Attorney, Agent, or Firm* — Holland & Hart LLP

(57) ABSTRACT

Methods, systems, and devices for wireless communications are described. Generally, the described techniques provide for a user equipment (UE) receiving, from a base station, an indication that first and second downlink control channel candidates are linked for repetition. The UE may decode downlink control information (DCI) from one or both candidates. The DCI may schedule shared channel resources in the same transmission time interval as at least one of the candidates, or the DCI may include a channel state information request that is associated with reference signal resources that are positioned in the same transmission time interval as one or both candidates. The UE may apply a rule to determine that the downlink shared channel resources or that the reference signal resources and the downlink control channel candidates are validly positioned. The UE may communicate (e.g., receive a downlink message or transmit a report) based on application of the rule.

44 Claims, 17 Drawing Sheets

(56) References Cited

U.S. PATENT DOCUMENTS

2022/0225284 A1* 7/2022 Hakola ............. H04W 72/1263
2023/0147122 A1* 5/2023 Canonne-Velasquez ....................
   H04L 5/005
   370/329
2023/0156738 A1* 5/2023 Gao ...................... H04L 5/0053
   370/330

OTHER PUBLICATIONS

International Search Report and Written Opinion—PCT/US2022/019507—ISA/EPO—Jun. 17, 2022 (2102988WO).

Qualcomm Incorporated: "Enhancements on Multi-TRP for PDCCH, PUCCH and PUSCH", 3GPP TSG-RAN WG1 Meeting #104-e, R1-2101447, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), pp. 1-28, XP051971612, Retrieved from the Internet: URL: https://ftp.3gpp.org/tsg_ran/WG1_RL1/TSGR1_104-e/Docs/R1-2101447.zip R1-2101447 Enhancements on Multi-TRP for PDCCH, PUCCH and PUSCH.docx [retrieved on Jan. 19, 2021] p. 10-p. 21 Section 3-Section 5, Sections 2.1, 2.2, 2.3, 4.6, Figures 8-19, Figures 1, 3.

* cited by examiner

VERIFYING RESOURCES ASSOCIATED WITH REPETITION-BASED LINKED DOWNLINK CONTROL CHANNEL CANDIDATES

CROSS REFERENCE

The present application for patent claims the benefit of U.S. Provisional Patent Application No. 63/162,473 by KHOSHNEVISAN et al., entitled "VERIFYING RESOURCES ASSOCIATED WITH REPETITION-BASED LINKED DOWNLINK CONTROL CHANNEL CANDIDATES," filed Mar. 17, 2021, assigned to the assignee hereof, and expressly incorporated by reference herein.

FIELD OF TECHNOLOGY

The following relates to wireless communications, including verifying resources associated with repetition-based linked downlink control channel candidates.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Resources for various channels and signals that a UE is to use for communications in a wireless communications system may be assigned by a base station. Due to processing complexity, interference, and other considerations, the position of such resources relative to other resources may impact communication reliability and efficiency.

SUMMARY

The described techniques relate to improved methods, systems, devices, and apparatuses that support verifying resources associated with repetition-based linked downlink control channel candidates. Generally, the described techniques provide for a user equipment (UE) receiving, from a base station, an indication that first and second downlink control channel candidates are linked. The first downlink control channel candidate may be received at least partially before the second downlink control channel candidate. The UE may decode downlink control information (DCI) from one or both candidates. The DCI may schedule downlink shared channel resources in the same transmission time interval as at least one of the candidates, or the DCI may include a channel state information request that is associated with reference signal resources that are positioned in the same transmission time interval as one or both candidates. The UE may apply a confirmatory rule to determine that the downlink shared channel resources and the downlink control channel candidates are validly positioned or to determine that the reference signal resources and the downlink control channel candidates are validly positioned. The UE may communicate (e.g., receive a downlink message or transmit a channel state information report) based on satisfaction of the confirmatory rule.

A method for wireless communication at a user equipment (UE) is described. The method may include receiving, from a base station, an indication that a first downlink control channel candidate in a first search space set is linked to a second downlink control channel candidate in a second search space set, the first downlink control channel candidate being received, at least partially, before the second downlink control channel candidate, decoding downlink control information from at least one of the first downlink control channel candidate or the second downlink control channel candidate, the downlink control information scheduling resources for a downlink shared channel in a transmission time interval that includes at least the second downlink control channel candidate, and receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

An apparatus for wireless communication at a UE is described. The apparatus may include a processor, memory coupled with the processor, and instructions stored in the memory. The instructions may be executable by the processor to cause the apparatus to receive, from a base station, an indication that a first downlink control channel candidate in a first search space set is linked to a second downlink control channel candidate in a second search space set, the first downlink control channel candidate being received, at least partially, before the second downlink control channel candidate, decode downlink control information from at least one of the first downlink control channel candidate or the second downlink control channel candidate, the downlink control information scheduling resources for a downlink shared channel in a transmission time interval that includes at least the second downlink control channel candidate, and receive a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Another apparatus for wireless communication at a UE is described. The apparatus may include means for receiving, from a base station, an indication that a first downlink control channel candidate in a first search space set is linked to a second downlink control channel candidate in a second search space set, the first downlink control channel candidate being received, at least partially, before the second downlink control channel candidate, means for decoding downlink control information from at least one of the first downlink control channel candidate or the second downlink control channel candidate, the downlink control information scheduling resources for a downlink shared channel in a transmission time interval that includes at least the second downlink control channel candidate, and means for receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

A non-transitory computer-readable medium storing code for wireless communication at a UE is described. The code may include instructions executable by a processor to receive, from a base station, an indication that a first downlink control channel candidate in a first search space set is linked to a second downlink control channel candidate in a second search space set, the first downlink control channel candidate being received, at least partially, before the second downlink control channel candidate, decode downlink control information from at least one of the first downlink control channel candidate or the second downlink control channel candidate, the downlink control information scheduling resources for a downlink shared channel in a transmission time interval that includes at least the second downlink control channel candidate, and receive a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

In some examples of the method, apparatuses, and non-transitory computer-readable medium described herein, the transmission time interval may be a second transmission time interval and the method, apparatuses, and non-transitory computer-readable medium may include further operations, features, means, or instructions for determining that the first downlink control channel candidate may be positioned within a first transmission time interval preceding the second transmission time interval including the second downlink control channel candidate and the resources and verifying, based on determining that the first downlink control channel candidate may be positioned within the first transmission time interval, that the confirmatory rule may be satisfied by the second downlink control channel candidate being positioned within the threshold number of symbols of the second transmission time interval.

Some examples of the method, apparatuses, and non-transitory computer-readable medium described herein may further include operations, features, means, or instructions for determining that both the first downlink control channel candidate and the second downlink control channel candidate may be positioned within the transmission time interval in which the resources may be scheduled, where the confirmatory rule may be applicable based on the first downlink control channel candidate and the second downlink control channel candidate being positioned within the transmission time interval.

In some examples of the method, apparatuses, and non-transitory computer-readable medium described herein, the verifying may include operations, features, means, or instructions for verifying, based on determining that both the first downlink control channel candidate and the second downlink control channel candidate may be positioned within the transmission time interval, that the confirmatory rule may be satisfied by both the first downlink control channel candidate and the second downlink control channel candidate being positioned within the threshold number of symbols of the transmission time interval.

In some examples of the method, apparatuses, and non-transitory computer-readable medium described herein, the verifying may include operations, features, means, or instructions for verifying, based on determining that both the first downlink control channel candidate and the second downlink control channel candidate may be positioned within the transmission time interval, that the confirmatory rule may be satisfied by at least one of the first downlink control channel candidate and the second downlink control channel candidate being positioned within the threshold number of symbols of the transmission time interval.

Some examples of the method, apparatuses, and non-transitory computer-readable medium described herein may further include operations, features, means, or instructions for determining that the downlink control information schedules the resources for the downlink shared channel with a type A resource mapping, where the confirmatory rule may be applicable based on the downlink control information scheduling the resources with the type A resource mapping.

In some examples of the method, apparatuses, and non-transitory computer-readable medium described herein, receiving the indication may include operations, features, means, or instructions for receiving, via a radio resource control message, an indication that the first search space set and the second search space set may be linked, where the first downlink control channel candidate and the second downlink control channel candidate may be linked based on the first search space set and the second search space set being linked.

In some examples of the method, apparatuses, and non-transitory computer-readable medium described herein, the threshold number of symbols may be three.

A method for wireless communications at a UE is described. The method may include receiving, from a base station, an indication that a first downlink control channel candidate in a first search space set is linked to a second downlink control channel candidate in a second search space set, the first downlink control channel candidate being received, at least partially, before the second downlink control channel candidate, decoding downlink control information from at least one of the first downlink control channel candidate or the second downlink control channel candidate, where the downlink control information includes a channel state information request, and transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

An apparatus for wireless communications at a UE is described. The apparatus may include a processor, memory coupled with the processor, and instructions stored in the memory. The instructions may be executable by the processor to cause the apparatus to receive, from a base station, an indication that a first downlink control channel candidate in a first search space set is linked to a second downlink control channel candidate in a second search space set, the first downlink control channel candidate being received, at least partially, before the second downlink control channel candidate, decode downlink control information from at least one of the first downlink control channel candidate or the second downlink control channel candidate, where the downlink control information includes a channel state information request, and transmit, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Another apparatus for wireless communications at a UE is described. The apparatus may include means for receiving, from a base station, an indication that a first downlink control channel candidate in a first search space set is linked to a second downlink control channel candidate in a second search space set, the first downlink control channel candidate being received, at least partially, before the second downlink control channel candidate, means for decoding downlink control information from at least one of the first downlink control channel candidate or the second downlink control channel candidate, where the downlink control information includes a channel state information request, and means for transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

A non-transitory computer-readable medium storing code for wireless communications at a UE is described. The code may include instructions executable by a processor to receive, from a base station, an indication that a first downlink control channel candidate in a first search space set is linked to a second downlink control channel candidate in a second search space set, the first downlink control channel candidate being received, at least partially, before the second downlink control channel candidate, decode downlink control information from at least one of the first downlink control channel candidate or the second downlink control channel candidate, where the downlink control information includes a channel state information request, and transmit, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

In some examples of the method, apparatuses, and non-transitory computer-readable medium described herein, verifying, based on the first downlink control channel candidate and the second downlink control channel candidate being linked, that the confirmatory rule may be satisfied by the reference signal resources being positioned after a starting symbol of the second downlink control channel candidate.

In some examples of the method, apparatuses, and non-transitory computer-readable medium described herein, verifying, based on the first downlink control channel candidate and the second downlink control channel candidate being linked and the first downlink control channel candidate being received before the second downlink control channel candidate, that the confirmatory rule may be satisfied by the reference signal resources being positioned after the starting symbol of only the first downlink control channel candidate.

In some examples of the method, apparatuses, and non-transitory computer-readable medium described herein, receiving the indication may include operations, features, means, or instructions for receiving, via a radio resource control message, an indication that the first search space set and the second search space set may be linked, where the first downlink control channel candidate and the second downlink control channel candidate may be linked based on the first search space set and the second search space set being linked.

Some examples of the method, apparatuses, and non-transitory computer-readable medium described herein may further include operations, features, means, or instructions for determining the reference signal resources based on the channel state information request included in the downlink control information.

A method for wireless communications at a base station is described. The method may include transmitting, to a UE, an indication that a first downlink control channel candidate in a first search space set is linked to a second downlink control channel candidate in a second search space set, the first downlink control channel candidate being transmitted, at least partially, before the second downlink control channel candidate, transmitting, to the UE via the first downlink control channel candidate and the second downlink control channel candidate, downlink control information that schedules resources for a downlink shared channel in a transmission time interval that includes at least the second downlink control channel candidate, and transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

An apparatus for wireless communications at a base station is described. The apparatus may include a processor, memory coupled with the processor, and instructions stored in the memory. The instructions may be executable by the processor to cause the apparatus to transmit, to a UE, an indication that a first downlink control channel candidate in a first search space set is linked to a second downlink control channel candidate in a second search space set, the first downlink control channel candidate being transmitted, at least partially, before the second downlink control channel candidate, transmit, to the UE via the first downlink control channel candidate and the second downlink control channel candidate, downlink control information that schedules resources for a downlink shared channel in a transmission time interval that includes at least the second downlink control channel candidate, and transmit a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Another apparatus for wireless communications at a base station is described. The apparatus may include means for transmitting, to a UE, an indication that a first downlink control channel candidate in a first search space set is linked to a second downlink control channel candidate in a second search space set, the first downlink control channel candidate being transmitted, at least partially, before the second downlink control channel candidate, means for transmitting, to the UE via the first downlink control channel candidate and the second downlink control channel candidate, downlink control information that schedules resources for a downlink shared channel in a transmission time interval that includes at least the second downlink control channel candidate, and means for transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

A non-transitory computer-readable medium storing code for wireless communications at a base station is described. The code may include instructions executable by a processor to transmit, to a UE, an indication that a first downlink control channel candidate in a first search space set is linked to a second downlink control channel candidate in a second search space set, the first downlink control channel candidate being transmitted, at least partially, before the second downlink control channel candidate, transmit, to the UE via the first downlink control channel candidate and the second downlink control channel candidate, downlink control information that schedules resources for a downlink shared channel in a transmission time interval that includes at least the second downlink control channel candidate, and transmit a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

In some examples of the method, apparatuses, and non-transitory computer-readable medium described herein, the transmission time interval may be a second transmission time interval and the method, apparatuses, and non-transitory computer-readable medium may include further operations, features, means, or instructions for determining that the first downlink control channel candidate may be positioned within a first transmission time interval preceding the second transmission time interval including the second downlink control channel candidate and the resources and verifying, based on determining that the first downlink control channel candidate may be positioned within the first transmission time interval, that the confirmatory rule may be satisfied by the second downlink control channel candidate being positioned within the threshold number of symbols of the second transmission time interval.

Some examples of the method, apparatuses, and non-transitory computer-readable medium described herein may further include operations, features, means, or instructions for determining that both the first downlink control channel candidate and the second downlink control channel candidate may be positioned within the transmission time interval in which the resources may be scheduled, where the confirmatory rule may be applicable based on the first downlink control channel candidate and the second downlink control channel candidate being positioned within the transmission time interval.

In some examples of the method, apparatuses, and non-transitory computer-readable medium described herein, the verifying may include operations, features, means, or instructions for verifying, based on determining that both the first downlink control channel candidate and the second downlink control channel candidate may be positioned within the transmission time interval, that the confirmatory rule may be satisfied by both the first downlink control channel candidate and the second downlink control channel candidate being positioned within the threshold number of symbols of the transmission time interval.

In some examples of the method, apparatuses, and non-transitory computer-readable medium described herein, the verifying may include operations, features, means, or instructions for verifying, based on determining that both the first downlink control channel candidate and the second downlink control channel candidate may be positioned within the transmission time interval, that the confirmatory rule may be satisfied by at least one of the first downlink control channel candidate and the second downlink control channel candidate being positioned within the threshold number of symbols of the transmission time interval.

In some examples of the method, apparatuses, and non-transitory computer-readable medium described herein, transmitting the downlink control information may include operations, features, means, or instructions for transmitting the downlink control information that schedules the resources for the downlink shared channel with a type A resource mapping, where the confirmatory rule may be applicable based on the downlink control information scheduling the resources with the type A resource mapping.

In some examples of the method, apparatuses, and non-transitory computer-readable medium described herein, transmitting the indication may include operations, features, means, or instructions for transmitting, via a radio resource control message, an indication that the first search space set and the second search space set may be linked, where the first downlink control channel candidate and the second downlink control channel candidate may be linked based on the first search space set and the second search space set being linked.

In some examples of the method, apparatuses, and non-transitory computer-readable medium described herein, the threshold number of symbols may be three.

A method for wireless communications at a base station is described. The method may include transmitting, to a UE, an indication that a first downlink control channel candidate in a first search space set is linked to a second downlink control channel candidate in a second search space set, the first downlink control channel candidate being transmitted, at least partially, before the second downlink control channel candidate, transmitting, to the UE via the first downlink control channel candidate and the second downlink control channel candidate, downlink control information that includes a channel state information request, and receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

An apparatus for wireless communications at a base station is described. The apparatus may include a processor, memory coupled with the processor, and instructions stored in the memory. The instructions may be executable by the processor to cause the apparatus to transmit, to a UE, an indication that a first downlink control channel candidate in a first search space set is linked to a second downlink control channel candidate in a second search space set, the first downlink control channel candidate being transmitted, at least partially, before the second downlink control channel candidate, transmit, to the UE via the first downlink control channel candidate and the second downlink control channel candidate, downlink control information that includes a channel state information request, and receive, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Another apparatus for wireless communications at a base station is described. The apparatus may include means for transmitting, to a UE, an indication that a first downlink control channel candidate in a first search space set is linked to a second downlink control channel candidate in a second search space set, the first downlink control channel candidate being transmitted, at least partially, before the second downlink control channel candidate, means for transmitting, to the UE via the first downlink control channel candidate and the second downlink control channel candidate, downlink control information that includes a channel state information request, and means for receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

A non-transitory computer-readable medium storing code for wireless communications at a base station is described. The code may include instructions executable by a processor to transmit, to a UE, an indication that a first downlink control channel candidate in a first search space set is linked to a second downlink control channel candidate in a second search space set, the first downlink control channel candidate being transmitted, at least partially, before the second downlink control channel candidate, transmit, to the UE via the first downlink control channel candidate and the second downlink control channel candidate, downlink control information that includes a channel state information request, and receive, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Some examples of the method, apparatuses, and non-transitory computer-readable medium described herein may further include operations, features, means, or instructions for verifying based on the first downlink control channel candidate and the second downlink control channel candidate being linked, that the confirmatory rule may be satisfied by the reference signal resources being positioned after a starting symbol of the second downlink control channel candidate.

In some examples of the method, apparatuses, and non-transitory computer-readable medium described herein, verifying, based on the first downlink control channel candidate and the second downlink control channel candidate being linked and the first downlink control channel candidate being transmitted before the second downlink control channel candidate, that the confirmatory rule may be satisfied by the reference signal resources being positioned after the starting symbol of only the first downlink control channel candidate.

In some examples of the method, apparatuses, and non-transitory computer-readable medium described herein, transmitting the indication may include operations, features, means, or instructions for transmitting, via a radio resource control message, an indication that the first search space set and the second search space set may be linked, where the first downlink control channel candidate and the second downlink control channel candidate may be linked based on the first search space set and the second search space set being linked.

Some examples of the method, apparatuses, and non-transitory computer-readable medium described herein may further include operations, features, means, or instructions for indicating the reference signal resources based on the channel state information request included in the downlink control information.

DETAILED DESCRIPTION

Figure 1:
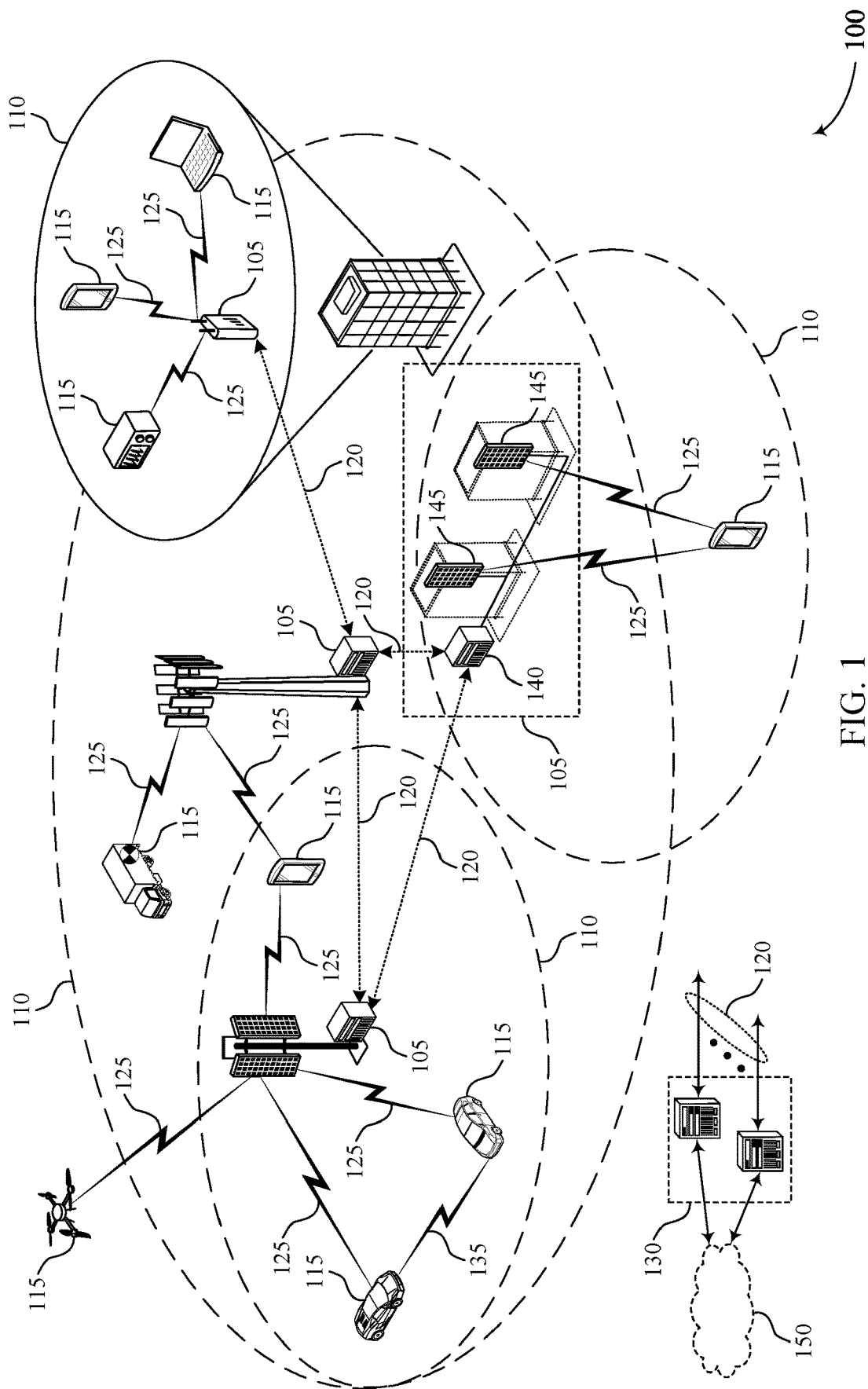
FIG. 1 illustrates an example of a wireless communications system that supports verifying resources associated with repetition-based linked downlink control channel candidates in accordance with aspects of the present disclosure.

Resources for various channels and signals that a user equipment (UE) is to use for communications in a wireless communications system may assigned by a base station. Due to processing complexity, interference, and other considerations, the position of such resources relative to other resources may impact communication reliability and efficiency. In some cases, a base station may configure a UE with resources for a physical downlink shared channel (PDSCH) with a certain resource mapping type (e.g., a mapping Type A). Due to various considerations, a physical downlink control channel (PDCCH) scheduling a PDSCH in the same slot of the PDCCH is not expected to schedule the PDSCH with the Type A mapping if the PDCCH is not received within some threshold number of symbols of the slot. That is, a PDSCH with a type A mapping may be scheduled in the same slot of the scheduling PDCCH if the scheduling PDCCH is contained within the first three symbols of the slot.

Another resource consideration scenario relates to channel state information (CSI) reference signal resources. A downlink control information (DCI) message may trigger a CSI report on a physical uplink shared channel (PUSCH). Based on a CSI request field in the DCI, a UE may identify CSI-RS resources that the UE is to measure for the CSI reporting. Due to various considerations, a UE may not expect that an aperiodic CSI-RS is transmitted before the symbols that carry the triggering DCI (e.g., the DCI that includes the CSI report request). More particularly, the UE expects that the CSI-RS resources are positioned during or after the first symbol carrying the DCI that triggers measurement of the CSI-RS resources.

Some wireless communications systems may support PDCCH repetition in order to improve communication reliability and efficiencies. That is, by repeating PDCCH transmissions, a receiving UE may have a higher probability of successful decoding of the PDCCH, and thus is able to identify various control information including scheduling information for other channels. In some cases, a UE may decode one of the PDCCH candidates. In such cases, the network or base station may not be configured with information to identify which of the candidates that the UE was able to decode. In such cases, the applicability of resource configuration considerations may be unclear.

Implementations described herein provide techniques for application of a confirmatory rule when repetitive (and linked) PDCCHs are configured. In some examples, a UE may decode DCI from one or both of a first and second PDCCH candidate (that are linked), and the DCI may schedule resources for a PDSCH. The UE may apply a rule to verify that at least one of the first PDCCH candidate or the second PDCCH candidate is within a threshold number of symbols at the beginning of the transmission time interval (e.g., a slot) in which the PDSCH resources are scheduled. In some cases, the UE may consider whether the candidates are positioned inter or intra-slot to determine the confirmatory rule to apply.

In some examples, the UE may decode DCI from one or both of a first and second PDCCH candidate (that are linked), and the DCI may include a CSI request. The UE may apply a rule to verify that reference signal resources associated with the CSI request are positioned after a starting symbol of at least the first PDCCH candidate. In some cases, the UE may verify that the reference signal resources are positioned after the starting symbol of both the first and the second PDCCH candidate. These and other implementations are further described herein with respect to the following figures.

Aspects of the disclosure are initially described in the context of wireless communications systems. Aspects of the disclosure are further described with respect to a wireless communications system, various resource diagrams, and a process flow diagram. Aspects of the disclosure are further illustrated by and described with reference to apparatus diagrams, system diagrams, and flowcharts that relate to verifying resources associated with repetition-based linked downlink control channel candidates.

FIG. 1 illustrates an example of a wireless communications system 100 that supports verifying resources associated with repetition-based linked downlink control channel candidates in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support channel repetition in order to increase the communication reliability. For example, a base station 105 may repeat PDCCH transmissions in order to increase the likelihood that a receiving UE 115 decodes the DCI of the PDCCH and thus identifies control and scheduling information. However, in such cases, the network (base station 105) may not be able to identify the candidate in which the DCI is decoded by the UE 115. Thus, resource location considerations may be difficult to apply by the UE 115 and the base station 105.

Implementations described herein support confirmatory rules that the UE 115 and/or the base station 105 may apply in a PDCCH repetition scenario. For example, if the UE 115 is configured to monitor for PDCCH repetitions, the UE 115 may apply one or more rules when the DCI included in one of the repetitions schedules a PDSCH (e.g., type A) or triggers a CSI report. For PDSCH type A scheduling, the UE 115 may decode the DCI in one or both of a first PDCCH candidate and a second PDCCH candidate and apply a rule to determine that at least one of the first PDCCH candidate or the second PDCCH candidate is within a threshold number of symbols at a beginning of the transmission time interval in which the resources for the PDSCH are scheduled. The UE 115 may receive a downlink message in the PDSCH resources based on application of the rule. In some examples, the UE 115 may consider whether the first and second PDCCH repetitions are inter or intra-slot and apply a rule based on the determination.

For CSI-RS reporting triggered by a DCI of a linked PDCCH candidate, the UE 115 may decode the DCI (including a CSI request) in one or both of a first PDCCH candidate and a second PDCCH candidate and apply a rule to determine that reference signal resources associated with the CSI request are positioned after a starting symbol of at least the first PDCCH candidate (e.g., the earliest candidate). The UE 115 may transmit a CSI report based on application of the rule. In some cases, the UE 115 may determine that the reference signal resources are positioned after a starting symbol of both the first and the second PDCCH candidate.

Thus, using these rules, the UE 115 may determine that the position of various resources may not cause additional complexity considerations, interference, or some other error condition. Further, the base station 105 may determine that such rules are confirmed when scheduling various resources, such as CSI-RS resources and PDSCH resources. Thus, application of these rules may improve communication reliability and efficiency, among other benefits.

Figure 2:
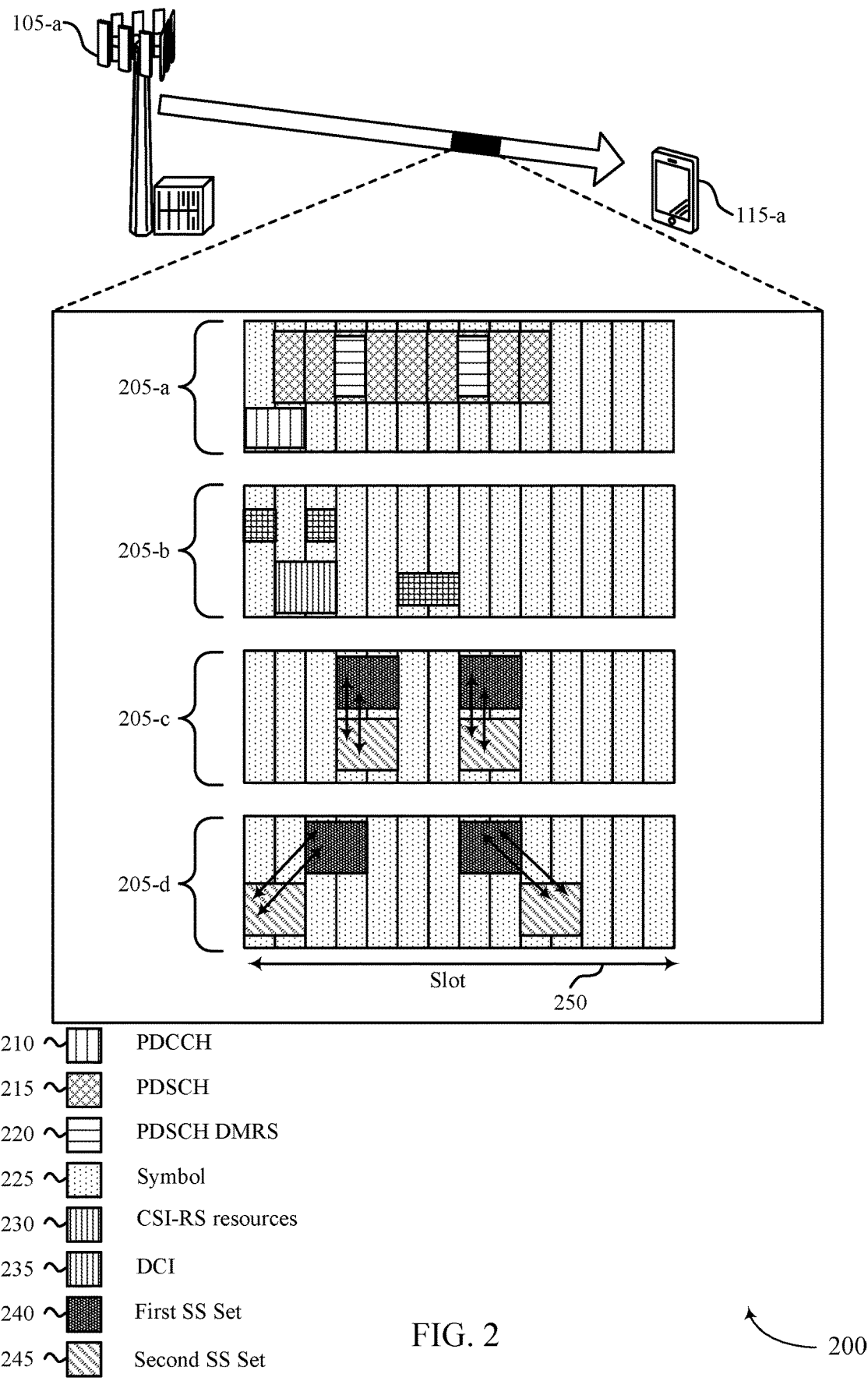
FIG. 2 illustrates an example of a wireless communications system that supports verifying resources associated with repetition-based linked downlink control channel candidates in accordance with aspects of the present disclosure.

FIG. 2 illustrates an example of a wireless communications system 200 that supports verifying resources associated with repetition-based linked downlink control channel candidates in accordance with aspects of the present disclosure. The wireless communications system 200 may implement aspects of wireless communications system 100. For example, the wireless communications system 200 includes a base station 105-a and a UE 115-a, which may be examples of the corresponding devices of FIG. 1. FIG. 2 illustrates examples of communications 205 between the base station 105-a and the UE 115-a.

As illustrated by communications 205-a, the wireless communications system 200 may support the base station 105-a transmitting control information in a PDCCH 210 that schedules a PDSCH 215. In some cases, the control information (e.g., DCI) may trigger the PDSCH 215 with a type A mapping, as illustrated in communications 205-a. According to a type A PDSCH mapping, a first demodulation reference signal (DMRS) 215 symbol of the PDSCH 215 is in either the third symbol (symbol number 2) or the fourth symbol (symbol number 3) of the transmission time interval (e.g., slot 250). The DMRS 220 symbol location may be configured in a master information block (MIB). In type A mapping scenarios, the starting symbol of the PDSCH 215 may be symbol number zero, one, two, or three of the slot

250. The starting symbol of the PDSCH may be configured dynamically in the time-domain resource allocation (TDRA) field of the DCI, which may be included in the PDCCH 210. In consideration of processing complexity, among other considerations, the UE 115-*a* may not expect to receive the PDSCH 215 with the type A mapping (as illustrated in communications 205-*a*) in the slot 250 if the PDCCH 210 scheduling the PDSCH 215 is received in the same slot 250 and was not contained with the first three symbols of the slot. As illustrated, the PDCCH 210 is contained with the first three symbols 225 and thus satisfies the rule. If, however, the PDCCH 210 was not contained with the first three symbols 225, then the UE 115-*a* may throw an error, ignore the resources, or perform another operation depending on the UE 115-*a* implementation.

As illustrated in communications 205-*a*, the wireless communications system 200 may support CSI reporting. A DCI 235 (e.g., included in a PDCCH 210), which may be an example of a DCI format 0_1 or 0_2 uplink DCI, may trigger a CSI report on a PUSCH, which may be referred to as an aperiodic CSI report. The DCI may include a CSI request field that indicates a trigger state of a plurality of trigger states that are RRC configured (e.g., via a higher layer parameter AperiodicTriggerStateList). Each trigger state in the list may be linked to a CSI-RS resource set, and each CSI-RS resource set may have multiple CSI-RS resources. The UE 115-*a* may measure the CSI-RS resources (e.g., the CSI-RS resources 230) and transmit a CSI report on resources of a PUSCH. To determine the location of the CSI-RS resources, a slot offset may be configured for each CSI-RS resource set using control messaging, such as RRC. When the slot offset of a CSI-RS resource set associated with a trigger state indicated in the DCI is 0, the CSI-RS resources within the CSI-RS resource set are received in the same slot as the DCI. In consideration of processing complexity, among other considerations, the UE 115-*a* may not expect that an aperiodic CSI-RS is transmitted before the OFDM symbol(s) 225 carrying the triggering DCI 235, when the CSI-RS resources are transmitted in the same slot as the triggering DCI 235. If, however, the CSI-RS resources 230 are before the DCI 235, as illustrated in communications 205-*b*, then the UE 115-*a* may throw an error, ignore the resources, or perform some other operation depending on the UE 115-*a* implementation.

The wireless communications system 200 may also support configurating the UE 115-*a* with a set of control resource sets (CORESETs) in a bandwidth part of a serving cell. Each CORESET may be associated with an active transmission configuration indicator (TCI) state. RRC signaling may be used to configure the resource blocks in the frequency domain and the number of symbols of the CORESET as part of the CORESET configurations. A PDCCH search space set (SS set) may be associated with one CORESET, and an upper limit (e.g., 10) search space sets in a bandwidth part of the component carrier/serving cell may be determined. Control signaling, such as RRC signaling, may be used to configure a search space set with an associated CORESET, monitoring slot periodicity and offset, monitoring symbols within the slot (e.g., to determine PDCCH monitoring occasions of the search space set), DCI formats to monitor, and the number of PDCCH candidates for a given aggregation level.

PDCCH candidates may be defined as a part of the search space set configurations. A PDCCH candidate with a given aggregation level and a given candidate index is defined in a given search space set. A DCI may be received in one PDCCH candidate, and the UE 115-*a* may monitor the PDCCH candidates in search space sets. One or more candidates with a cyclic redundancy check pass (successful decoding) may correspond to a decoded DCI, and the UE 115-*a* may blindly decode the DCI.

As described herein, the wireless communications system 200 may support PDCCH repetitions, where each repetition is a PDCCH candidate. Two PDCCH candidates may carry the same DCI, and thus may be considered "linked." The two linked PDCCH candidates may have the same aggregation level (same number of control channel elements), and the DCI payload transmitted using the two PDCCH candidates may be the same. A UE 115-*b* may perform soft combining of multiple PDCCH candidates to decode the DCI. To support the soft combining, the UE 115-*a* may be configured to identify the linked PDCCH candidates. To support the linking, two search space sets (carrying the PDCCH candidates) may be linked via control signaling, such as RRC signaling. A monitoring occasion of two linked search space sets may be one-to-one mapped. PDCCH candidates with the same aggregation level and the same candidate index in the two linked search space sets may be linked, and two linked search space sets may be configured with the same number of candidates for each aggregation level.

A first search space set 240 and a second search space set 245 are illustrated in the slot 250. Arrows across the first search space set 240 and the second search space set 245 illustrate linked PDCCH candidates within the respective search space sets. Communications 205-*c* and communications 205-*d* illustrate possible search space set configurations, but it should be understood that other configurations are contemplated within the scope of the present disclosure.

When a DCI 235 that schedules a PDSCH 215 with a mapping Type A, or the DCI 235 triggers one or more aperiodic CSI-RS resources, and the DCI 235 is received in the same slot as one or both of the linked PDCCH candidates, the resource considerations regarding the PDSCH resources and the CSI-RS resources may be unclear. More particularly, as the UE 115-*a* may decode the DCI in the first PDCCH repetition, the second PDCCH repetition, or both the first and the second repetition, the network (e.g., the base station 105-*a*) may not be able to identify the repetition that carries the DCI that the UE decodes. In such cases, the UE 115-*a* may not be able to determine where to consider the resources relative to the PDCCH or DCI.

Implementations described herein provide one or more confirmatory rules that the UE 115-*a* may apply when some conditions occur. For example, if the UE 115-*a* detects a DCI 235 in PDCCH candidates that are linked for PDCCH repetition (e.g., in two corresponding search space sets and monitoring occasions that are linked), and the DCI schedules a PDSCH with a mapping type A, the UE 115-*a* may apply a confirmatory rule that considers whether at least one of the first PDCCH candidate or the second PDCCH candidate is within a threshold number of symbols at a beginning of the transmission time interval in which the PDSCH resources are scheduled. In some cases, the UE 115-*a* may consider whether the PDCCH candidates are inter or intra-slot to determine whether one or both candidates are within the threshold number of symbols at the beginning of the slot.

Figure 3A:
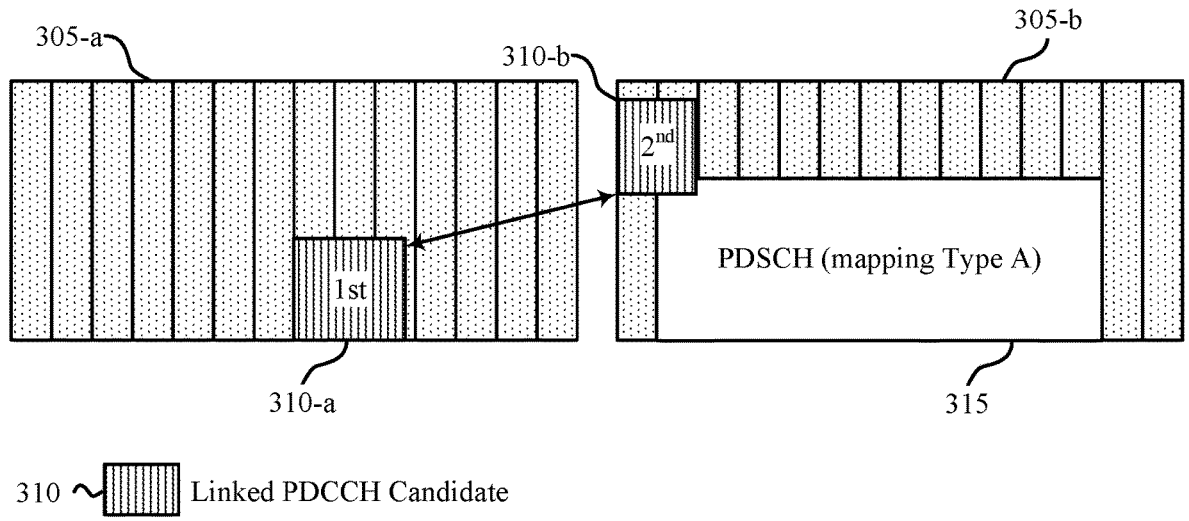
FIG. 3A and FIG. 3B illustrate examples of resource diagrams that demonstrate verifying resources associated with repetition-based linked downlink control channel candidates in accordance with aspects of the present disclosure
Figure 3B:
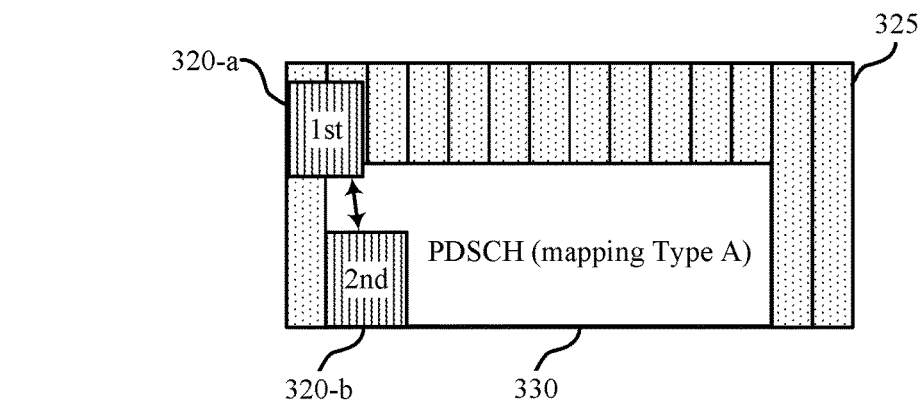

FIG. 3A and FIG. 3B illustrate examples of resource diagrams 300 that demonstrate verifying resources associated with repetition-based linked downlink control channel candidates in accordance with aspects of the present disclosure. In some examples, the resource diagrams may implement aspects of wireless communications system 100. For example, a UE 115 may receive, from a base station 105 (as described with reference to FIGS. 1 and 2), an indication that a first PDCCH candidate in a first search space set is linked to a second PDCCH candidate in a second search space set, where the first PDCCH candidate precedes, at least partially, the second PDCCH candidate. In some examples, the first PDCCH candidate may reside in a first slot (e.g., TTI) and the second PDCCH candidate may reside in a second slot, as illustrated in FIG. 3A. Alternatively, the first PDCCH candidate and the second PDCCH candidate may reside in a common slot, as illustrated in FIG. 3B. As described in further detail, the DCI of the linked PDCCH candidates in FIGS. 3A and 3B schedule a PDSCH (e.g., a PDSCH with a type A mapping) in a slot (e.g., TTI) of at least one of the linked candidates. As such, the UE and the base station may apply a confirmatory rule to determine whether the PDSCH resources and the PDCCH candidates are valid.

FIG. 3A illustrates a resource diagram 300-a including a first TTI 305-a and a second TTI 305-b. In some cases, a first PDCCH candidate 310-a corresponding to a first search space may be in the first TTI 305-a while a second PDCCH candidate 310-b corresponding to a second search space may be in the second TTI 305-b. The positions of the search space sets, and thus the linked PDCCH candidates 310, may be configured by a base station. In some instances, a base station may transmit an indication to a UE that the first PDCCH candidate 310-a (e.g., a first PDCCH candidate) is linked to the second PDCCH candidate 310-b (e.g., a second PDCCH candidate). Specifically, the base station may transmit, and the UE may receive, at least one RRC message indicating that a first search space and a second search space are linked (e.g., for repetition). The indication may be in the form of CORESET and search space set configuration, as described with respect to FIG. 2. Based on the first search space, the second search space, and the RRC, the UE may determine the first PDCCH candidate 310-a and the second PDCCH candidate 310-b are linked. Further, the base station may schedule the search space set such that the first PDCCH candidate 310-a may, at least partially, precede the second PDCCH candidate 310-b. Further, based on the indication, the UE may determine that the first PDCCH candidate 310-a is positioned within the first TTI 305-a and the second PDCCH candidate 310-b is positioned within the second TTI 305-b (e.g., inter-slot positioning).

Since the PDCCH candidates 310 may be linked, the PDCCH candidates may carry the same DCI payload. The UE may decode the DCI of the first PDCCH candidate 310-a, the second PDCCH candidate 310-b, or both. The UE may determine the DCI schedules resources for a PDSCH with a Type A resource mapping. For example, the UE may determine the DCI schedules resources for PDSCH in the second TTI 305-b that includes the second PDCCH candidate 310-b. Since the PDSCH resources are scheduled in a slot (e.g., second TTI 305-b) that contains a linked PDCCH candidate that carries the scheduling DCI (e.g., PDCCH candidate 310-b), the UE may apply a confirmatory rule to verify that the second PDCCH candidate 310-b is positioned within a threshold number of symbols (e.g., 3 symbols) at the beginning of the second TTI 305-b corresponding to the resources scheduled for PDSCH. More particularly, when the PDCCH candidates are positioned inter-slot, as illustrated in FIG. 3A, and the PDSCH 315 is scheduled in same slot as the later PDCCH candidate (e.g., the second PDCCH candidate 310-b), the UE may apply the confirmatory rule. Based on the determination and verification, the base station may transmit, and the UE may receive, a downlink message within the verified resources including a type A resource mapping corresponding to scheduled PDSCH resources.

FIG. 3B illustrates a resource diagram 300-b including a first PDCCH candidate 320-a and a second PDCCH candidate 320-b within a TTI 325 (e.g., a slot). A base station may transmit an indication (e.g., RRC configuration) to a UE that the first PDCCH candidate 320-a is linked to the second PDCCH candidate 320-b. Based on the indication, the UE may determine the first PDCCH candidate 320-a and the second PDCCH candidate 320-b are linked. The configuration may specify that both the first PDCCH candidate 320-a and the second PDCCH candidate 320-b are positioned within the TTI 325 (e.g., intra-slot). The base station transmit a DCI in the first PDCCH candidate 320-a and the second PDCCH candidate 320-b. The UE may decode the DCI associated with the first PDCCH candidate 320-a, the second PDCCH candidate 320-b, or both. The UE may determine that the DCI schedules resources for a PDSCH 330 with a Type A resource mapping.

In some cases, the UE and the base station may determine the first PDCCH candidate 320-a and the second PDCCH candidate 320-b are positioned within the TTI 325 in which the resources (e.g., PDSCH with a Type A resource mapping) are scheduled. Based on the determination, the UE and the base station may apply a confirmatory rule to verify the positions of the first PDCCH candidate 320-a and the second PDCCH candidate 320-b within the TTI 325 and relative to the PDSCH resources that are scheduled in the same TTI 325. Specifically, the UE and the base station may verify that one or both the first PDCCH candidate 320-a and the second PDCCH candidate 320-b are positioned within the one or more of the threshold number of symbols at the beginning of the TTI 325 (e.g., the first three symbols in some implementations). Thus, when both PDCCH candidates 320 are positioned in the same TTI of the PDSCH 330 with a type A mapping, the UE and base station may apply a confirmatory rule to determine whether one or both PDCCH candidates 320 are validly placed. The device may apply either rule (e.g., verifying one or both candidate positioning), and the rule that is applied may be based on UE implementation, a pre-configuration, or a configuration from the base station. Based on the determination and verification, the base station may transmit, and the UE may receive, at least one downlink message within the verified resources of the PDSCH 330.

Thus, as illustrated in FIG. 3A and in FIG. 3B, when a DCI of a linked candidate schedules a PDSCH with a type A mapping in the linked candidate, the UE may apply one of the rules, which may depend on the positioning of the PDCCH candidates, to verify that the resources of the PDSCH and/or the PDCCH candidates are valid. This technique may support improved communication reliability and efficiency by reducing resource complexity.

Figure 4:
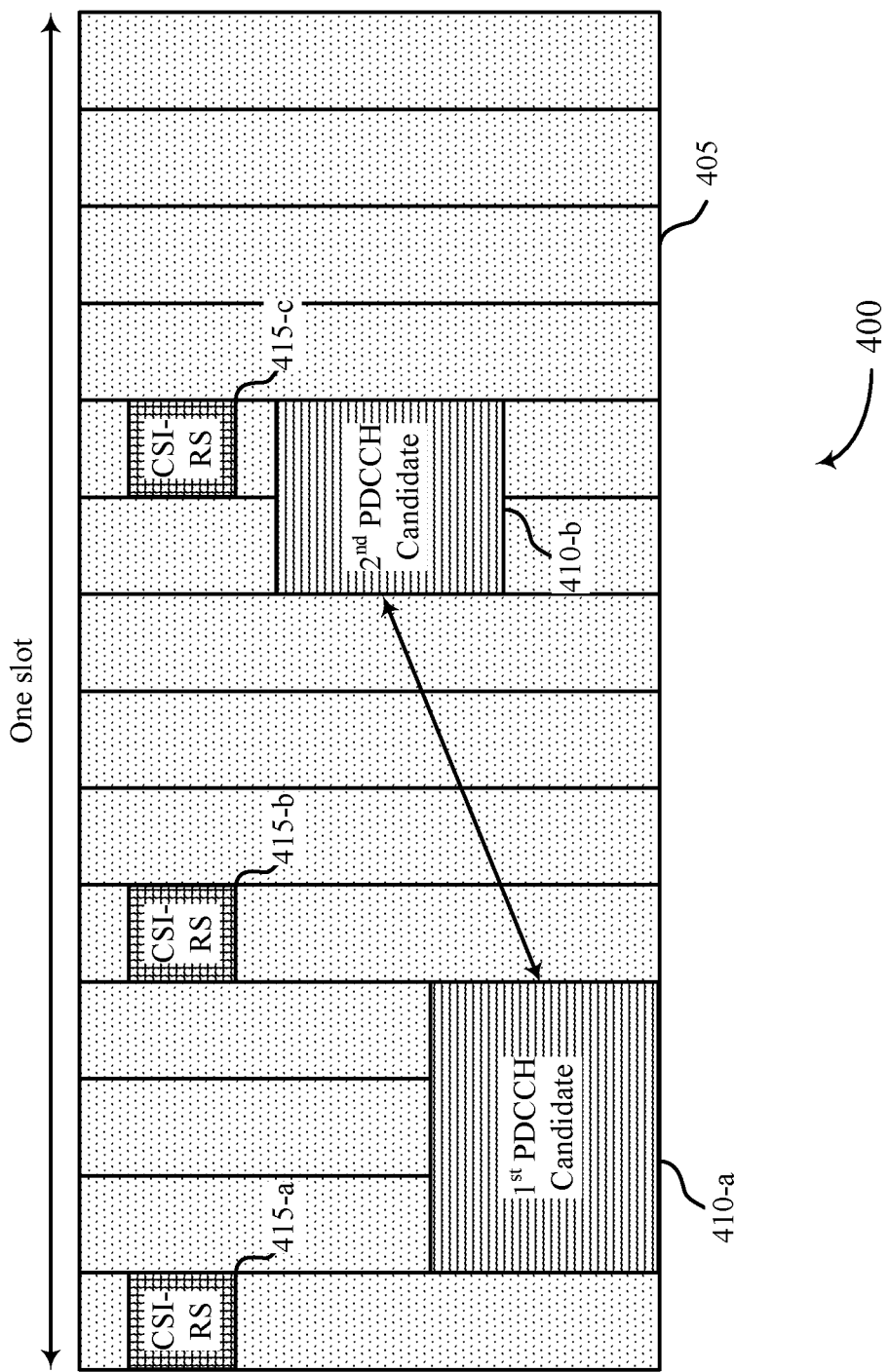
FIG. 4 illustrates an example of a resource diagram that demonstrates verifying resources associated with repetition-based linked downlink control channel candidates in accordance with aspects of the present disclosure.

FIG. 4 illustrates an example of a resource diagram 400 that supports verifying resources associated with repetition-based linked downlink control channel candidates in accordance with aspects of the present disclosure. In some examples, the resource diagram 400 may implement aspects of wireless communications system 100 and 200. For example, a UE 115 may receive, from a base station 105 (as described with reference to FIGS. 1 and 2), an indication that a first PDCCH candidate in a first search space set is linked to a second PDCCH in a second search space set, where the first PDCCH candidate precedes, at least partially, the second PDCCH candidate based on the search space set configuration. The search set configuration may be configured using control messaging, such as RRC messaging. In some examples, the first PDCCH candidate and the second PDCCH candidate may reside in a common slot (e.g., TTI 405) based on configurations of respective search space sets corresponding to the linked PDCCH candidates.

The base station may transmit, via the first PDCCH candidate 410-a and the second PDCCH candidate 410-b, a DCI including a CSI request to the UE. The CSI request may include a field (e.g., a trigger state indication) that corresponds to CSI-RS resources 415 that the UE is to use for measurement and CSI reporting. The UE may decode the DCI from the first PDCCH candidate 410-a, the second PDCCH candidate 410-b, or both and identify the CSI request included in the DCI and the corresponding CSI-RS resources 415. In some cases, the UE may determine which slot the CSI-RS resources 415 are positioned based on an offset indication in the DCI, as discussed in FIG. 2. If the CSI-RS resources 415 are scheduled in the same slot as the DCI that triggers the CSI-RS resources 415 (e.g., the offset indication in the DCI is 0), then the UE and the base station may apply a confirmatory rule to determine that the reference signal resources (e.g., CSI-RS resources 415) associated with the CSI request are validly scheduled. That is, the UE may not expect that the CSI-RS resources 415 are scheduled before the OFDM symbols of one or both of the PDCCH candidates 410 that carry the triggering DCI. In some examples, the rule specifies that only the earliest PDCCH candidate is considered (e.g., the CSI-RS resources 415-b are to be positioned after the starting symbol of the earliest PDCCH candidate 410-a). In other examples, the rules specifies that both PDCCH candidates are considered (e.g., the CSI-RS resources 415-c are to be positioned after the starting symbol of both PDCCH candidates 410). Which rule is applied may be pre-configured, configured by the base station, etc.

If the CSI-RS resources 415 are not validly scheduled, then the UE 115 may throw an error, ignore the invalid resources, or perform some other operation, based on the implementation. For example, as illustrated in FIG. 4, the CSI-RS resources 415-a do not satisfy the confirmatory rule due to a position before the earliest PDCCH candidate (as well as both PDCCH candidates 410), and as such, the UE may issue an error, ignore the CSI-RS resource 415-a, ignore the DCI, or perform some other operation. If the CSI-RS resources 415 do satisfy the confirmatory rule, then the UE may measure the CSI-RS resources 415 and transmit a CSI report to the base station.

Thus, as illustrated in FIG. 4, when a DCI of a linked candidate triggers CSI-RS resources in a TTI including the linked candidates, the UE may apply one of the rules to verify that the resources of the CSI-RS and/or the PDCCH candidates are valid. This technique may support improved communication reliability and efficiency by reducing resource complexity.

Figure 5:
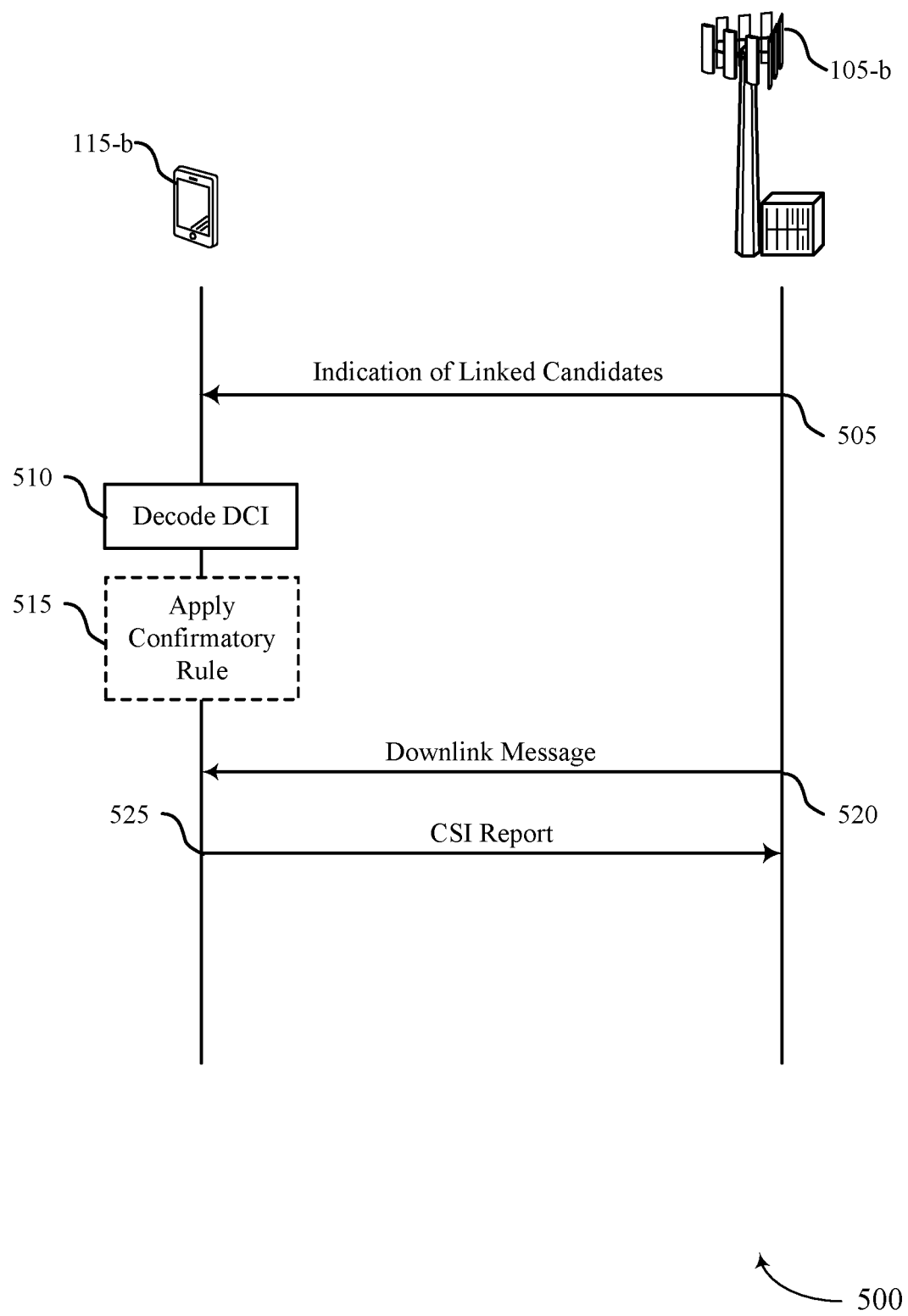
FIG. 5 illustrates an example of a process flow diagram that supports verifying resources associated with repetition-based linked downlink control channel candidates in accordance with aspects of the present disclosure.

FIG. 5 illustrates an example of a process flow diagram 500 that supports verifying resources associated with repetition-based linked downlink control channel candidates in accordance with aspects of the present disclosure. The process flow diagram 500 includes aspects of the wireless communications system 100 of FIGS. 1 and 200 of FIG. 2. For example, the process flow diagram includes a base station 105-b and a UE 115-b, which may be examples of the corresponding devices described with respect to FIG. 1. and FIG. 2. The base station 105-b and the UE 115-b may use various resources for communications, such as resources illustrated in resource diagrams 300 of FIG. 3 and resource diagram 400 of FIG. 4.

At 505, the UE 115-b may receive, from the base station 105-b, an indication that a first downlink control channel candidate in a first search space set is linked to a second downlink control channel candidate in a second search space set. The first downlink control channel candidate may be received, at least partially, before the second downlink control channel candidate. The indication may be in the form of an RRC configuration of respective search space sets corresponding to the control channel candidates. The UE 115-b may monitor the search space set to identify the control channel candidates.

At 510, the UE 115-b may decode downlink control information from at least one of the first downlink control channel candidate or the second downlink control channel candidate. In some examples, the downlink control information may schedule resources for a downlink shared channel (e.g., a PDSCH) in a transmission time interval that includes at least the second downlink control channel candidate. In some examples, the downlink control information may include a channel state information request.

At 515, the UE 115-b may apply a confirmatory rule based on the resources scheduled or triggered by the DCI. For example, in the case when the DCI schedules PDSCH resources for a downlink shared channel in a transmission time interval that at includes one or both downlink control channel candidates, then the confirmatory rule may be that that at least one of the first downlink control channel candidate or the second downlink control channel candidate is within a threshold number of symbols at a beginning of the transmission time interval in which the resources are scheduled. In some cases, the rule that is applied is based on the first downlink control channel candidate and the second downlink control channel candidate being positioned in separate transmission time intervals. In such cases, the UE 115-b may verify that the second downlink control channel candidate is positioned within the threshold number of symbols of the second transmission time interval. In some cases, the rule that is applied is based on both downlink control channel candidates being positioned in the same transmission time interval in which the downlink shared channel resources are scheduled. In such cases, the UE 115-b may verify that both the first downlink control channel candidate and the second downlink control channel candidate are positioned within the threshold number of symbols of the transmission time interval or that at least one of the first downlink control channel candidate and the second downlink control channel candidate are positioned within the threshold number of symbols of the transmission time interval.

In cases where the DCI includes a channel state information request, then the confirmatory rule may be that reference signal resources associated with the channel state information request are positioned after a starting symbol of at least the first downlink control channel candidate. In some cases when the DCI includes the channel state information request, the confirmatory rule is that the reference signal resources are positioned after a starting symbol of both the first and the second downlink control channel candidates.

At 520, when the DCI schedules the downlink shared channel, the UE 115-b may receive, from the base station 105-b, a downlink message in the resources based at least in part on satisfaction of a confirmatory rule associated with the first downlink control channel candidate and the second downlink control channel candidate being linked.

At 525, when the DCI includes a channel state information request, the UE 115-b may transmit, to the base station 105-b, a channel state information report based at least in part on satisfaction of a confirmatory rule associated with the first downlink control channel candidate and the second downlink control channel candidate being linked.

Figure 6:
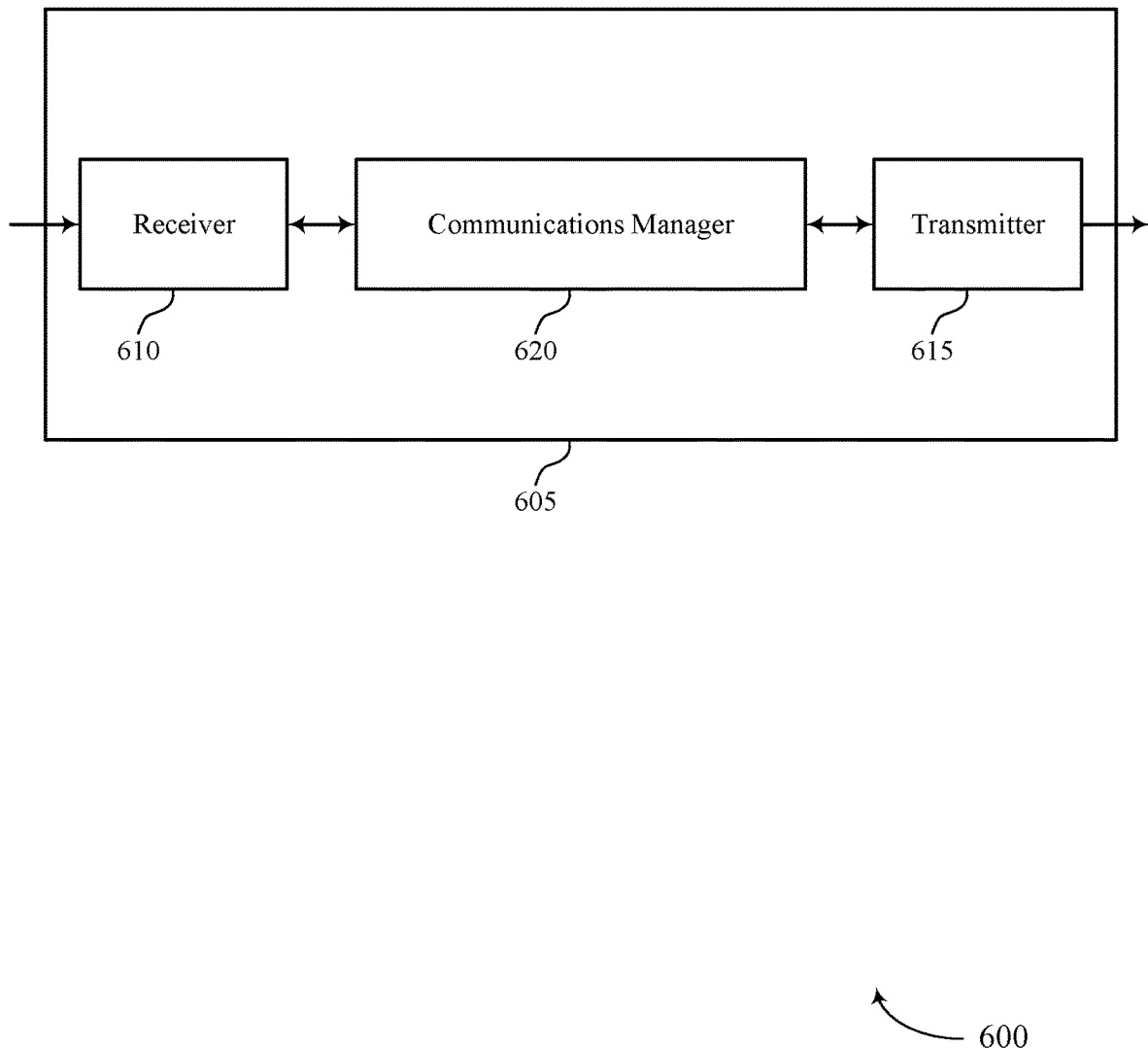
FIGS. 6 and 7 show block diagrams of devices that support verifying resources associated with repetition-based linked downlink control channel candidates in accordance with aspects of the present disclosure.

FIG. 6 shows a block diagram 600 of a device 605 that supports verifying resources associated with repetition-based linked downlink control channel candidates in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to verifying resources associated with repetition-based linked downlink control channel candidates). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to verifying resources associated with repetition-based linked downlink control channel candidates). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of verifying resources associated with repetition-based linked downlink control channel candidates as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The communications manager 620 may be configured as or otherwise support a means for decoding downlink control information from at least one of the first downlink control channel candidate or the second downlink control channel candidate, the downlink control information scheduling resources for a downlink shared channel in a transmission time interval that includes at least the second downlink control channel candidate. The communications manager 620 may be configured as or otherwise support a means for receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 620 may support wireless communications at a UE in accordance with examples as disclosed herein. For example, the communications manager 620 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The communications manager 620 may be configured as or otherwise support a means for decoding downlink control information from at least one of the first downlink control channel candidate or the second downlink control channel candidate, where the downlink control information includes a channel state information request. The communications manager 620 may be configured as or otherwise support a means for transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing by verifying that resources do not increase processing complexity, thus resulting in efficient utilization of communication resources.

Figure 7:
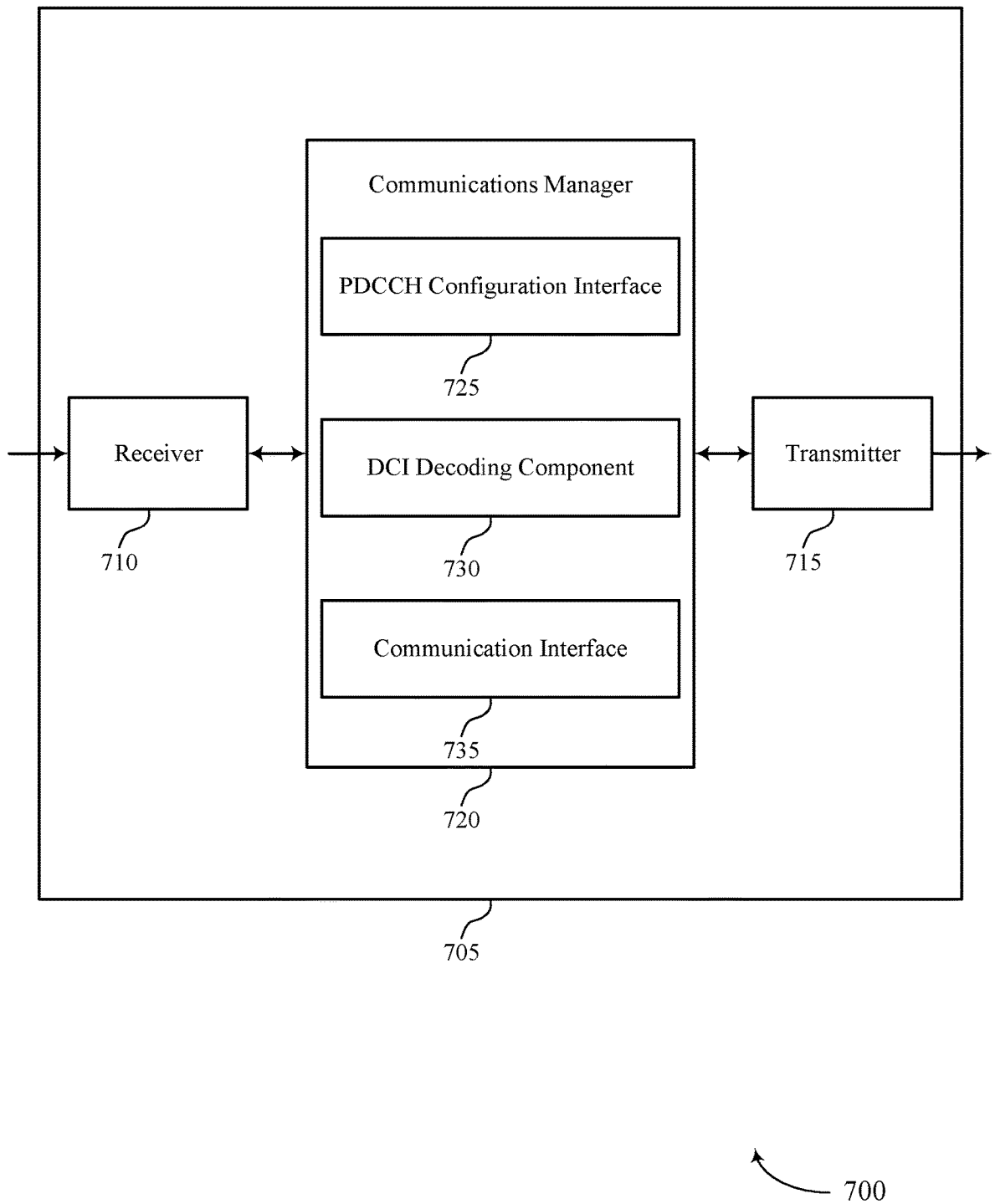

FIG. 7 shows a block diagram 700 of a device 705 that supports verifying resources associated with repetition-based linked downlink control channel candidates in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to verifying resources associated with repetition-based linked downlink control channel candidates). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to verifying resources associated with repetition-based linked downlink control channel candidates). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of verifying resources associated with repetition-based linked downlink control channel candidates as described herein. For example, the communications manager 720 may include a PDCCH configuration interface 725, a DCI decoding component 730, a communication interface 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The PDCCH configuration interface 725 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The DCI decoding component 730 may be configured as or otherwise support a means for decoding downlink control information from at least one of the first downlink control channel candidate or the second downlink control channel candidate, the downlink control information scheduling resources for a downlink shared channel in a transmission time interval that includes at least the second downlink control channel candidate. The communication interface 735 may be configured as or otherwise support a means for receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 720 may support wireless communications at a UE in accordance with examples as disclosed herein. The PDCCH configuration interface 725 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The DCI decoding component 730 may be configured as or otherwise support a means for decoding downlink control information from at least one of the first downlink control channel candidate or the second downlink control channel candidate, where the downlink control information includes a channel state information request. The communication interface 735 may be configured as or otherwise support a means for transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Figure 8:
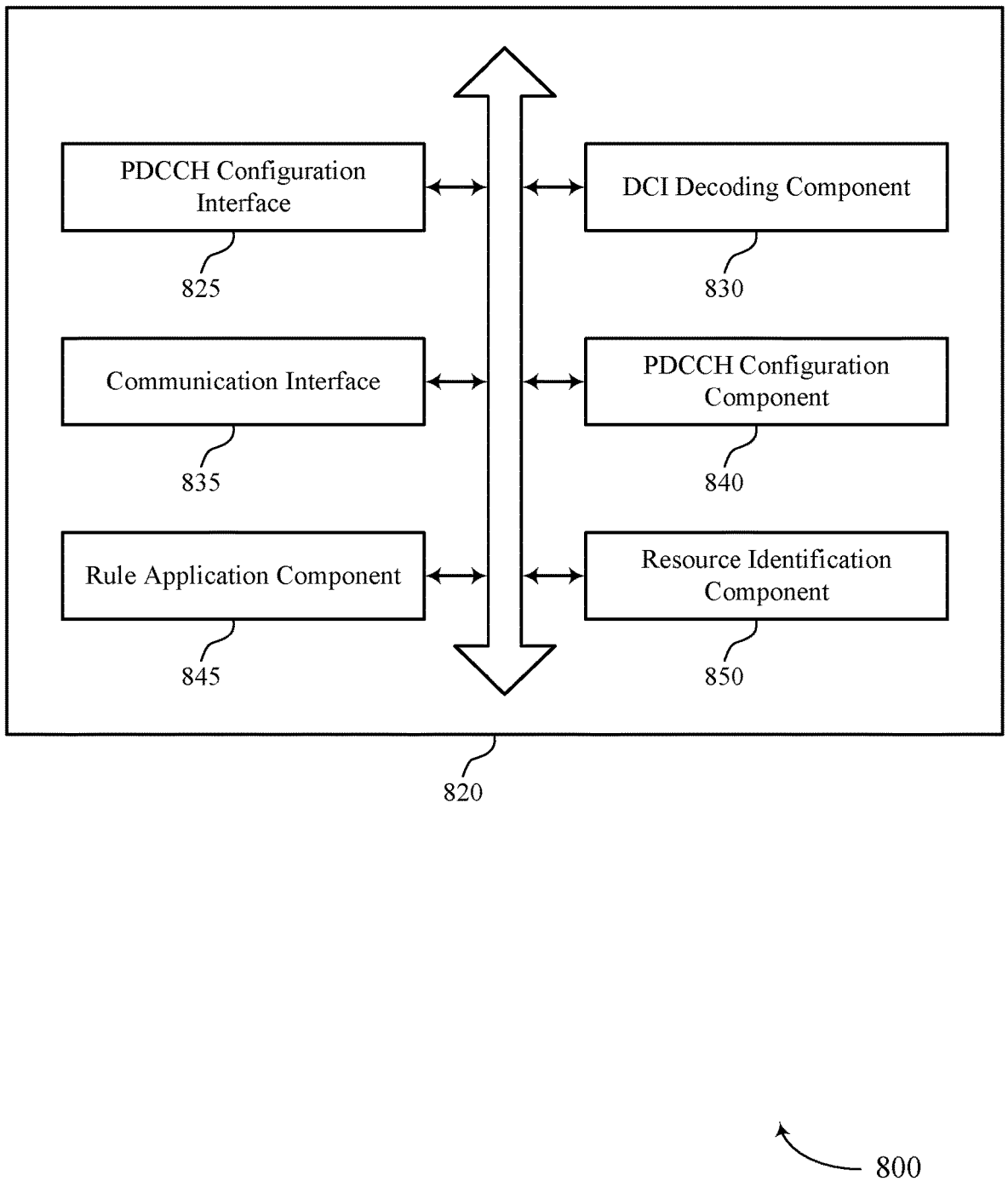
FIG. 8 shows a block diagram of a communications manager that supports verifying resources associated with repetition-based linked downlink control channel candidates in accordance with aspects of the present disclosure.

FIG. 8 shows a block diagram 800 of a communications manager 820 that supports verifying resources associated with repetition-based linked downlink control channel candidates in accordance with aspects of the present disclosure. The communications manager 820 may be an example of aspects of a communications manager 620, a communications manager 720, or both, as described herein. The communications manager 820, or various components thereof, may be an example of means for performing various aspects of verifying resources associated with repetition-based linked downlink control channel candidates as described herein. For example, the communications manager 820 may include a PDCCH configuration interface 825, a DCI decoding component 830, a communication interface 835, a PDCCH configuration component 840, a rule application component 845, a resource identification component 850, or any combination thereof. Each of these components may communicate, directly or indirectly, with one another (e.g., via one or more buses).

The communications manager 820 may support wireless communication at a UE in accordance with examples as disclosed herein. The PDCCH configuration interface 825 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The DCI decoding component 830 may be configured as or otherwise support a means for decoding downlink control information from at least one of the first downlink control channel candidate or the second downlink control channel candidate, the downlink control information scheduling resources for a downlink shared channel in a transmission time interval that includes at least the second downlink control channel candidate. The communication interface 835 may be configured as or otherwise support a means for receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

In some examples, the transmission time interval is a second transmission time interval, and the PDCCH configuration component 840 may be configured as or otherwise support a means for determining that the first downlink control channel candidate is positioned within a first transmission time interval preceding the second transmission time interval including the second downlink control channel candidate and the resources. In some examples, the transmission time interval is a second transmission time interval, and the rule application component 845 may be configured as or otherwise support a means for verifying, based on determining that the first downlink control channel candidate is positioned within the first transmission time interval, that the confirmatory rule is satisfied by the second downlink control channel candidate being positioned within the threshold number of symbols of the second transmission time interval.

In some examples, the PDCCH configuration component 840 may be configured as or otherwise support a means for determining that both the first downlink control channel candidate and the second downlink control channel candidate are positioned within the transmission time interval in which the resources are scheduled, where the confirmatory rule is applicable based on the first downlink control channel candidate and the second downlink control channel candidate being positioned within the transmission time interval.

In some examples, to support verifying, the rule application component 845 may be configured as or otherwise support a means for verifying, based on determining that both the first downlink control channel candidate and the second downlink control channel candidate are positioned within the transmission time interval, that the confirmatory rule is satisfied by both the first downlink control channel candidate and the second downlink control channel candidate being positioned within the threshold number of symbols of the transmission time interval.

In some examples, to support verifying, the rule application component 845 may be configured as or otherwise support a means for verifying, based on determining that both the first downlink control channel candidate and the second downlink control channel candidate are positioned within the transmission time interval, that the confirmatory rule is satisfied by at least one of the first downlink control channel candidate and the second downlink control channel candidate being positioned within the threshold number of symbols of the transmission time interval.

In some examples, the DCI decoding component 830 may be configured as or otherwise support a means for determining that the downlink control information schedules the resources for the downlink shared channel with a type A resource mapping, where the confirmatory rule is applicable based on the downlink control information scheduling the resources with the type A resource mapping.

In some examples, to support receiving the indication, the PDCCH configuration component 840 may be configured as or otherwise support a means for receiving, via a radio resource control message, an indication that the first search space set and the second search space set are linked, where the first downlink control channel candidate and the second downlink control channel candidate are linked based on the first search space set and the second search space set being linked.

In some examples, the threshold number of symbols is three.

Additionally or alternatively, the communications manager 820 may support wireless communications at a UE in accordance with examples as disclosed herein. In some examples, the PDCCH configuration interface 825 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. In some examples, the DCI decoding component 830 may be configured as or otherwise support a means for decoding downlink control information from at least one of the first downlink control channel candidate or the second downlink control channel candidate, where the downlink control information includes a channel state information request. In some examples, the communication interface 835 may be configured as or otherwise support a means for transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

In some examples, the rule application component 845 may be configured as or otherwise support a means for verifying, based on the first downlink control channel candidate and the second downlink control channel candidate being linked, that the confirmatory rule is satisfied by the reference signal resources being positioned after a starting symbol of the second downlink control channel candidate.

In some examples, the rule application component 845 may be configured as or otherwise support a means for verifying, based on the first downlink control channel candidate and the second downlink control channel candidate being linked and the first downlink control channel candidate being received before the second downlink control channel candidate, that the confirmatory rule is satisfied by the reference signal resources being positioned after the starting symbol of only the first downlink control channel candidate.

In some examples, to support receiving the indication, the PDCCH configuration interface 825 may be configured as or otherwise support a means for receiving, via a radio resource control message, an indication that the first search space set and the second search space set are linked, where the first downlink control channel candidate and the second downlink control channel candidate are linked based on the first search space set and the second search space set being linked.

In some examples, the resource identification component 850 may be configured as or otherwise support a means for determining the reference signal resources based on the channel state information request included in the downlink control information.

Figure 9:
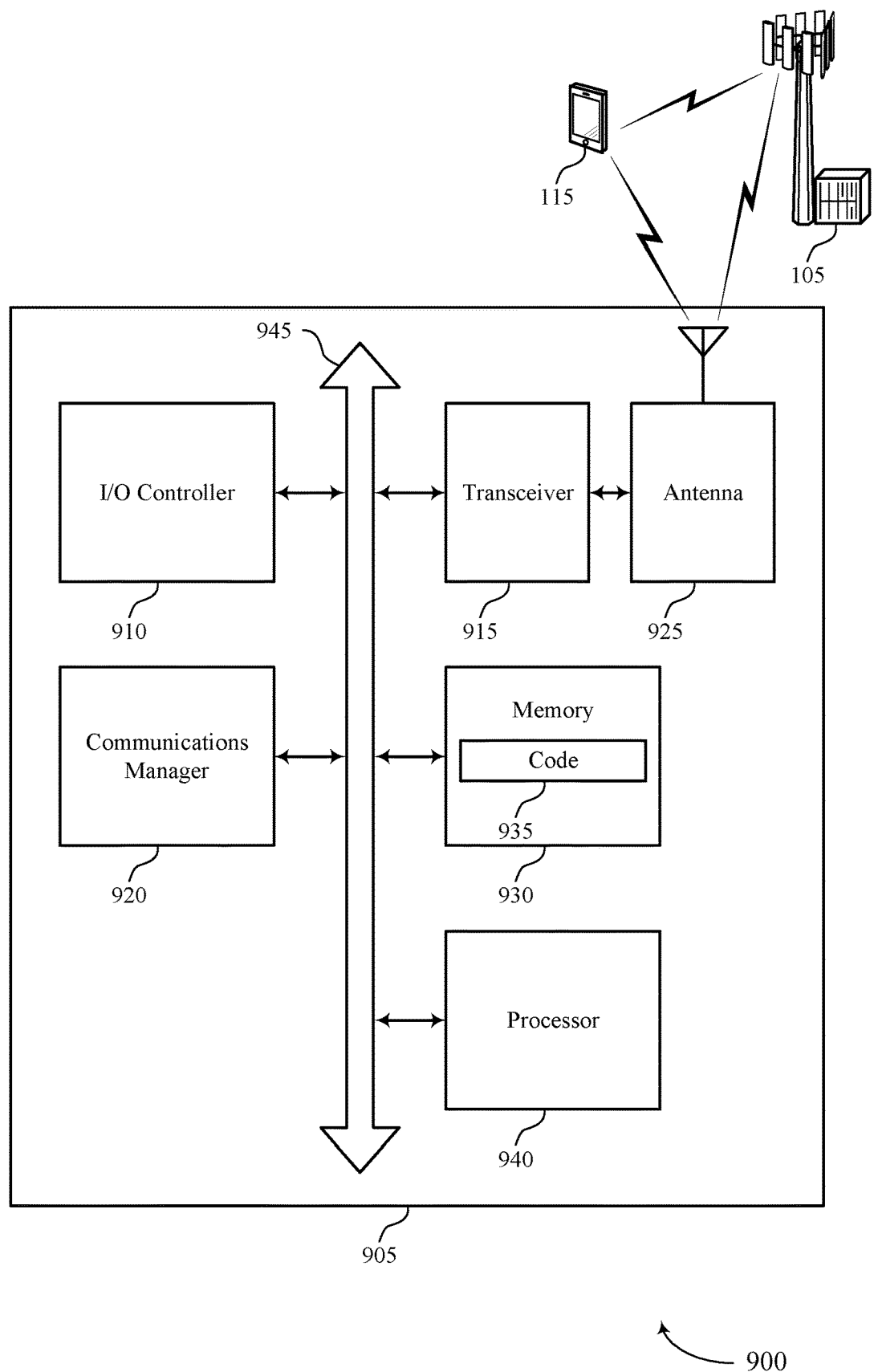
FIG. 9 shows a diagram of a system including a device that supports verifying resources associated with repetition-based linked downlink control channel candidates in accordance with aspects of the present disclosure.

FIG. 9 shows a diagram of a system 900 including a device 905 that supports verifying resources associated with repetition-based linked downlink control channel candidates in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting verifying resources associated with repetition-based linked downlink control channel candidates). For example, the device 905 or a component of the device 905 may include a processor 940 and memory 930 coupled with the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The communications manager 920 may be configured as or otherwise support a means for decoding downlink control information from at least one of the first downlink control channel candidate or the second downlink control channel candidate, the downlink control information scheduling resources for a downlink shared channel in a transmission time interval that includes at least the second downlink control channel candidate. The communications manager 920 may be configured as or otherwise support a means for receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 920 may support wireless communications at a UE in accordance with examples as disclosed herein. For example, the communications manager 920 may be configured as or otherwise support a means for receiving, from a base station, an indication that a first downlink control channel candidate in a first search space set is linked to a second downlink control channel candidate in a second search space set, the first downlink control channel candidate being received, at least partially, before the second downlink control channel candidate. The communications manager 920 may be configured as or otherwise support a means for decoding downlink control information from at least one of the first downlink control channel candidate or the second downlink control channel candidate, where the downlink control information includes a channel state information request. The communications manager 920 may be configured as or otherwise support a means for transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

By including or configuring the communications manager 920 in accordance with examples as described herein, the device 905 may support techniques for improved communication reliability by verifying that resources are processable by devices such as a UE, thus resulting in more efficient utilization of communication resources and processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of verifying resources associated with repetition-based linked downlink control channel candidates as described herein, or the processor 940 and the memory 930 may be otherwise configured to perform or support such operations.

Figure 10:
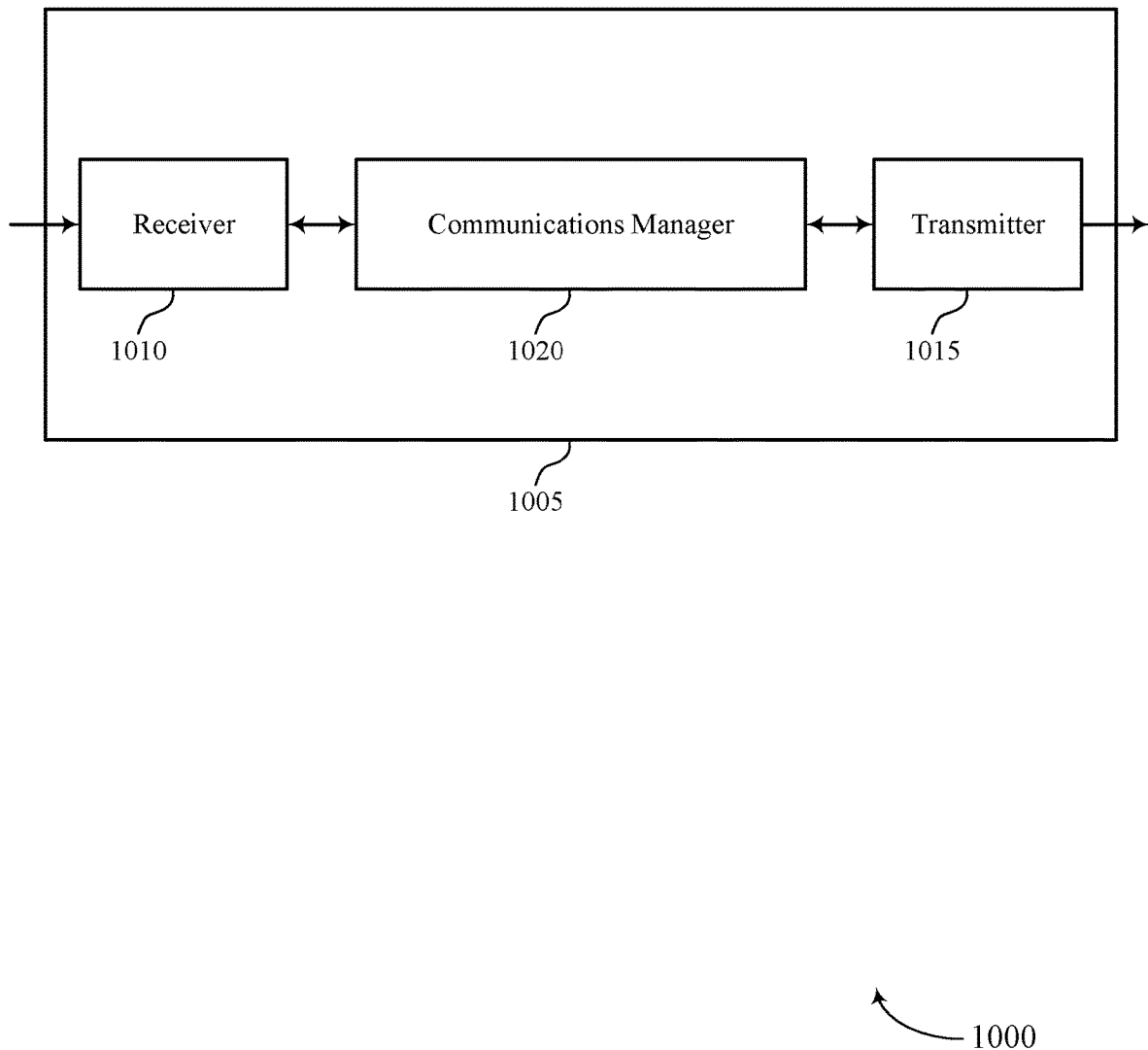
FIGS. 10 and 11 show block diagrams of devices that support verifying resources associated with repetition-based linked downlink control channel candidates in accordance with aspects of the present disclosure.

FIG. 10 shows a block diagram 1000 of a device 1005 that supports verifying resources associated with repetition-based linked downlink control channel candidates in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to verifying resources associated with repetition-based linked downlink control channel candidates). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to verifying resources associated with repetition-based linked downlink control channel candidates). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of verifying resources associated with repetition-based linked downlink control channel candidates as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The communications manager 1020 may be configured as or otherwise support a means for transmitting, to the UE via the first downlink control channel candidate and the second downlink control channel candidate, downlink control information that schedules resources for a downlink shared channel in a transmission time interval that includes at least the second downlink control channel candidate. The communications manager 1020 may be configured as or otherwise support a means for transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 1020 may support wireless communications at a base station in accordance with examples as disclosed herein. For example, the communications manager 1020 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The communications manager 1020 may be configured as or otherwise support a means for transmitting, to the UE via the first downlink control channel candidate and the second downlink control channel candidate, downlink control information that includes a channel state information request. The communications manager 1020 may be configured as or otherwise support a means for receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing by verifying that resources do not increase processing complexity, thus resulting in efficient utilization of communication resources.

Figure 11:
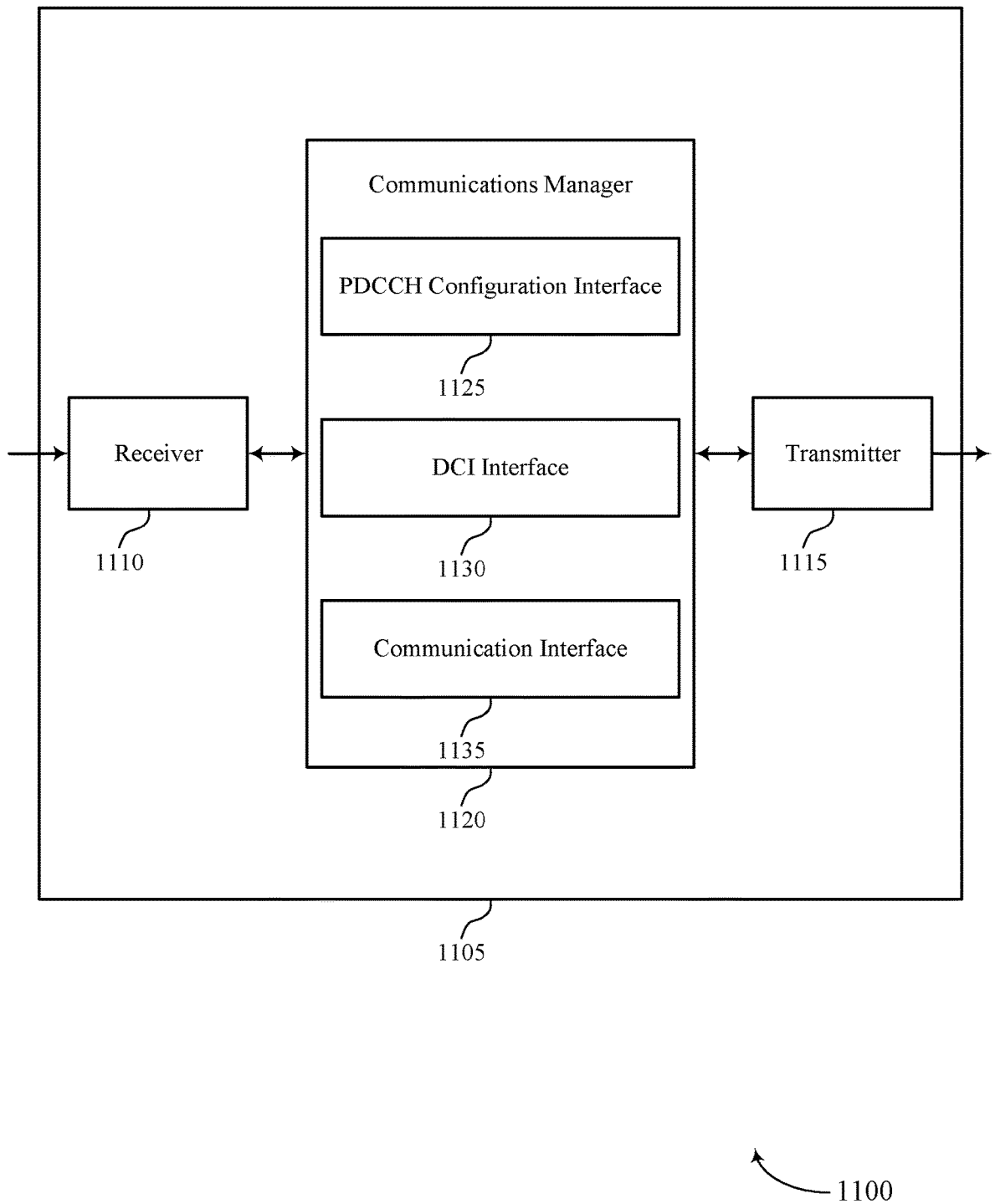

FIG. 11 shows a block diagram 1100 of a device 1105 that supports verifying resources associated with repetition-based linked downlink control channel candidates in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to verifying resources associated with repetition-based linked downlink control channel candidates). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to verifying resources associated with repetition-based linked downlink control channel candidates). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of verifying resources associated with repetition-based linked downlink control channel candidates as described herein. For example, the communications manager 1120 may include a PDCCH configuration interface 1125, a DCI interface 1130, a communication interface 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The PDCCH configuration interface 1125 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The DCI interface 1130 may be configured as or otherwise support a means for transmitting, to the UE via the first downlink control channel candidate and the second downlink control channel candidate, downlink control information that schedules resources for a downlink shared channel in a transmission time interval that includes at least the second downlink control channel candidate. The communication interface 1135 may be configured as or otherwise support a means for transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 1120 may support wireless communications at a base station in accordance with examples as disclosed herein. The PDCCH configuration interface 1125 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The DCI interface 1130 may be configured as or otherwise support a means for transmitting, to the UE via the first downlink control channel candidate and the second downlink control channel candidate, downlink control information that includes a channel state information request. The communication interface 1135 may be configured as or otherwise support a means for receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Figure 12:
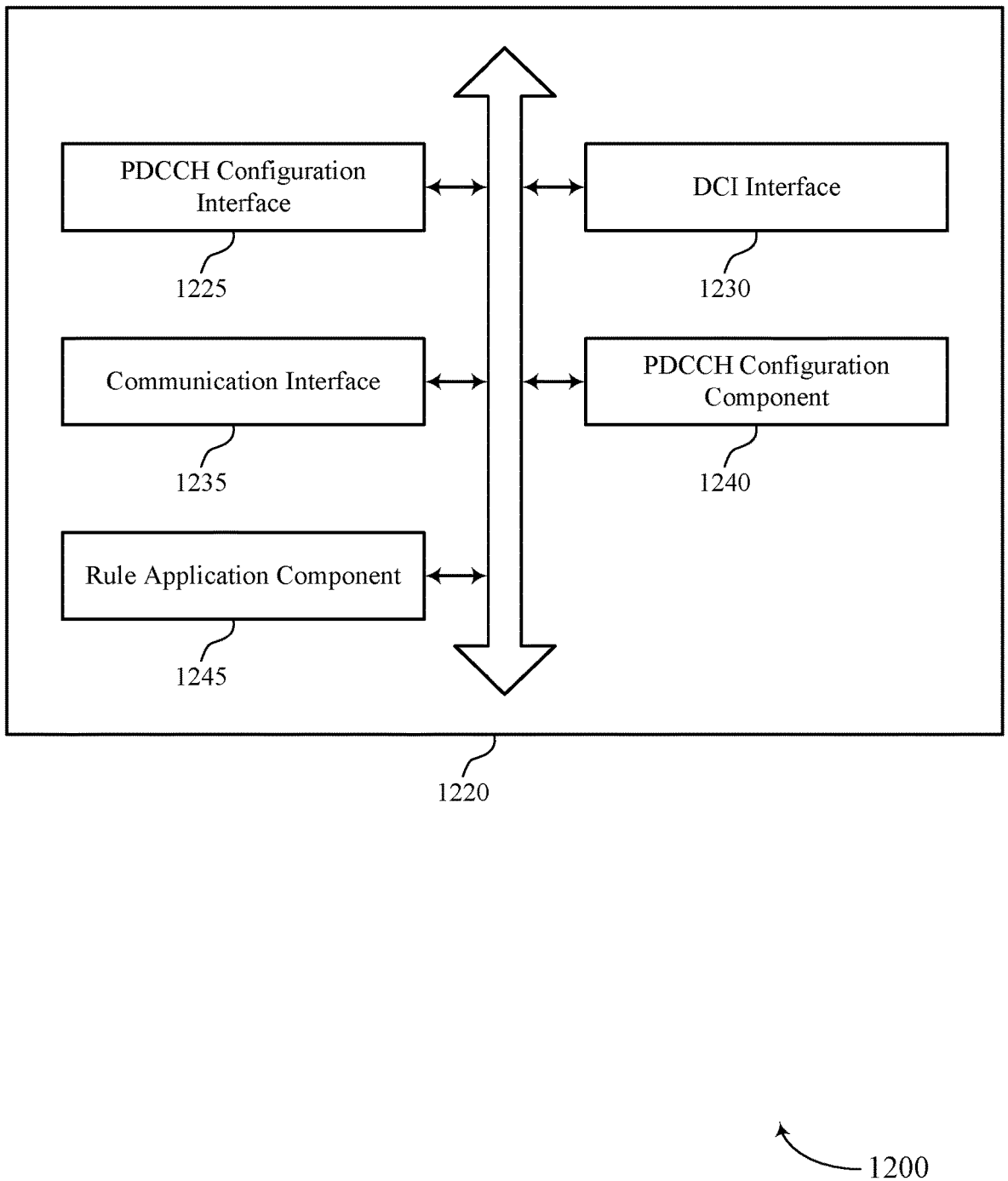
FIG. 12 shows a block diagram of a communications manager that supports verifying resources associated with repetition-based linked downlink control channel candidates in accordance with aspects of the present disclosure.

FIG. 12 shows a block diagram 1200 of a communications manager 1220 that supports verifying resources associated with repetition-based linked downlink control channel candidates in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of verifying resources associated with repetition-based linked downlink control channel candidates as described herein. For example, the communications manager 1220 may include a PDCCH configuration interface 1225, a DCI interface 1230, a communication interface 1235, a PDCCH configuration component 1240, a rule application component 1245, or any combination thereof. Each of these components may communicate, directly or indirectly, with one another (e.g., via one or more buses).

The communications manager 1220 may support wireless communications at a base station in accordance with examples as disclosed herein. The PDCCH configuration interface 1225 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The DCI interface 1230 may be configured as or otherwise support a means for transmitting, to the UE via the first downlink control channel candidate and the second downlink control channel candidate, downlink control information that schedules resources for a downlink shared channel in a transmission time interval that includes at least the second downlink control channel candidate. The communication interface 1235 may be configured as or otherwise support a means for transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

In some examples, the transmission time interval is a second transmission time interval, and the PDCCH configuration component 1240 may be configured as or otherwise support a means for determining that the first downlink control channel candidate is positioned within a first transmission time interval preceding the second transmission time interval including the second downlink control channel candidate and the resources. In some examples, the transmission time interval is a second transmission time interval, and the rule application component 1245 may be configured as or otherwise support a means for verifying, based on determining that the first downlink control channel candidate is positioned within the first transmission time interval, that the confirmatory rule is satisfied by the second downlink control channel candidate being positioned within the threshold number of symbols of the second transmission time interval.

In some examples, the PDCCH configuration component 1240 may be configured as or otherwise support a means for determining that both the first downlink control channel candidate and the second downlink control channel candidate are positioned within the transmission time interval in which the resources are scheduled, where the confirmatory rule is applicable based on the first downlink control channel candidate and the second downlink control channel candidate being positioned within the transmission time interval.

In some examples, to support verifying, the rule application component 1245 may be configured as or otherwise support a means for verifying, based on determining that both the first downlink control channel candidate and the second downlink control channel candidate are positioned within the transmission time interval, that the confirmatory rule is satisfied by both the first downlink control channel candidate and the second downlink control channel candidate being positioned within the threshold number of symbols of the transmission time interval.

In some examples, to support verifying, the rule application component 1245 may be configured as or otherwise support a means for verifying, based on determining that both the first downlink control channel candidate and the second downlink control channel candidate are positioned within the transmission time interval, that the confirmatory rule is satisfied by at least one of the first downlink control channel candidate and the second downlink control channel candidate being positioned within the threshold number of symbols of the transmission time interval.

In some examples, to support transmitting the downlink control information, the DCI interface 1230 may be configured as or otherwise support a means for transmitting the downlink control information that schedules the resources for the downlink shared channel with a type A resource mapping, where the confirmatory rule is applicable based on the downlink control information scheduling the resources with the type A resource mapping.

In some examples, to support transmitting the indication, the PDCCH configuration interface 1225 may be configured as or otherwise support a means for transmitting, via a radio resource control message, an indication that the first search space set and the second search space set are linked, where the first downlink control channel candidate and the second downlink control channel candidate are linked based on the first search space set and the second search space set being linked.

In some examples, the threshold number of symbols is three.

Additionally or alternatively, the communications manager 1220 may support wireless communications at a base station in accordance with examples as disclosed herein. In some examples, the PDCCH configuration interface 1225 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. In some examples, the DCI interface 1230 may be configured as or otherwise support a means for transmitting, to the UE via the first downlink control channel candidate and the second downlink control channel candidate, downlink control information that includes a channel state information request. In some examples, the communication interface 1235 may be configured as or otherwise support a means for receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

In some examples, the rule application component 1245 may be configured as or otherwise support a means for verifying based on the first downlink control channel candidate and the second downlink control channel candidate being linked, that the confirmatory rule is satisfied by the reference signal resources being positioned after a starting symbol of the second downlink control channel candidate.

In some examples, the rule application component 1245 may be configured as or otherwise support a means for verifying, based on the first downlink control channel candidate and the second downlink control channel candidate being linked and the first downlink control channel candidate being transmitted before the second downlink control channel candidate, that the confirmatory rule is satisfied by the reference signal resources being positioned after the starting symbol of only the first downlink control channel candidate.

In some examples, to support transmitting the indication, the PDCCH configuration interface 1225 may be configured as or otherwise support a means for transmitting, via a radio resource control message, an indication that the first search space set and the second search space set are linked, where the first downlink control channel candidate and the second downlink control channel candidate are linked based on the first search space set and the second search space set being linked.

In some examples, the DCI interface 1230 may be configured as or otherwise support a means for indicating the reference signal resources based on the channel state information request included in the downlink control information.

Figure 13:
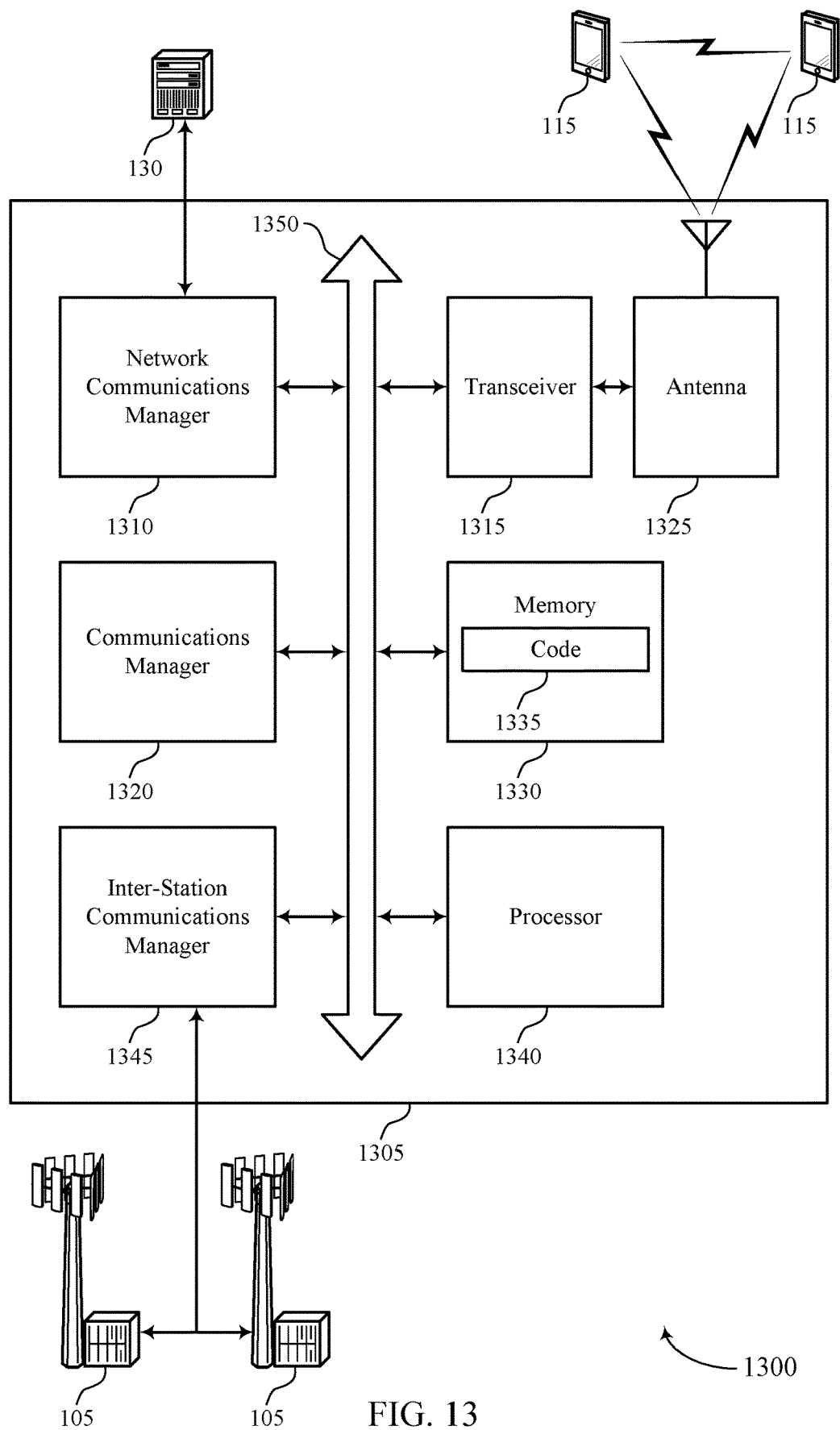
FIG. 13 shows a diagram of a system including a device that supports verifying resources associated with repetition-based linked downlink control channel candidates in accordance with aspects of the present disclosure.

FIG. 13 shows a diagram of a system 1300 including a device 1305 that supports verifying resources associated with repetition-based linked downlink control channel candidates in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting verifying resources associated with repetition-based linked downlink control channel candidates). For example, the device 1305 or a component of the device 1305 may include a processor 1340 and memory 1330 coupled with the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The communications manager 1320 may be configured as or otherwise support a means for transmitting, to the UE via the first downlink control channel candidate and the second downlink control channel candidate, downlink control information that schedules resources for a downlink shared channel in a transmission time interval that includes at least the second downlink control channel candidate. The communications manager 1320 may be configured as or otherwise support a means for transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Additionally or alternatively, the communications manager 1320 may support wireless communications at a base station in accordance with examples as disclosed herein. For example, the communications manager 1320 may be configured as or otherwise support a means for transmitting, to a UE, an indication that a first downlink control channel candidate in a first search space set is linked to a second downlink control channel candidate in a second search space set, the first downlink control channel candidate being transmitted, at least partially, before the second downlink control channel candidate. The communications manager 1320 may be configured as or otherwise support a means for transmitting, to the UE via the first downlink control channel candidate and the second downlink control channel candidate, downlink control information that includes a channel state information request. The communications manager 1320 may be configured as or otherwise support a means for receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

By including or configuring the communications manager 1320 in accordance with examples as described herein, the device 1305 may support techniques for improved communication reliability by verifying that resources are processable by devices such as a UE, thus resulting in more efficient utilization of communication resources and processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of verifying resources associated with repetition-based linked downlink control channel candidates as described herein, or the processor 1340 and the memory 1330 may be otherwise configured to perform or support such operations.

Figure 14:
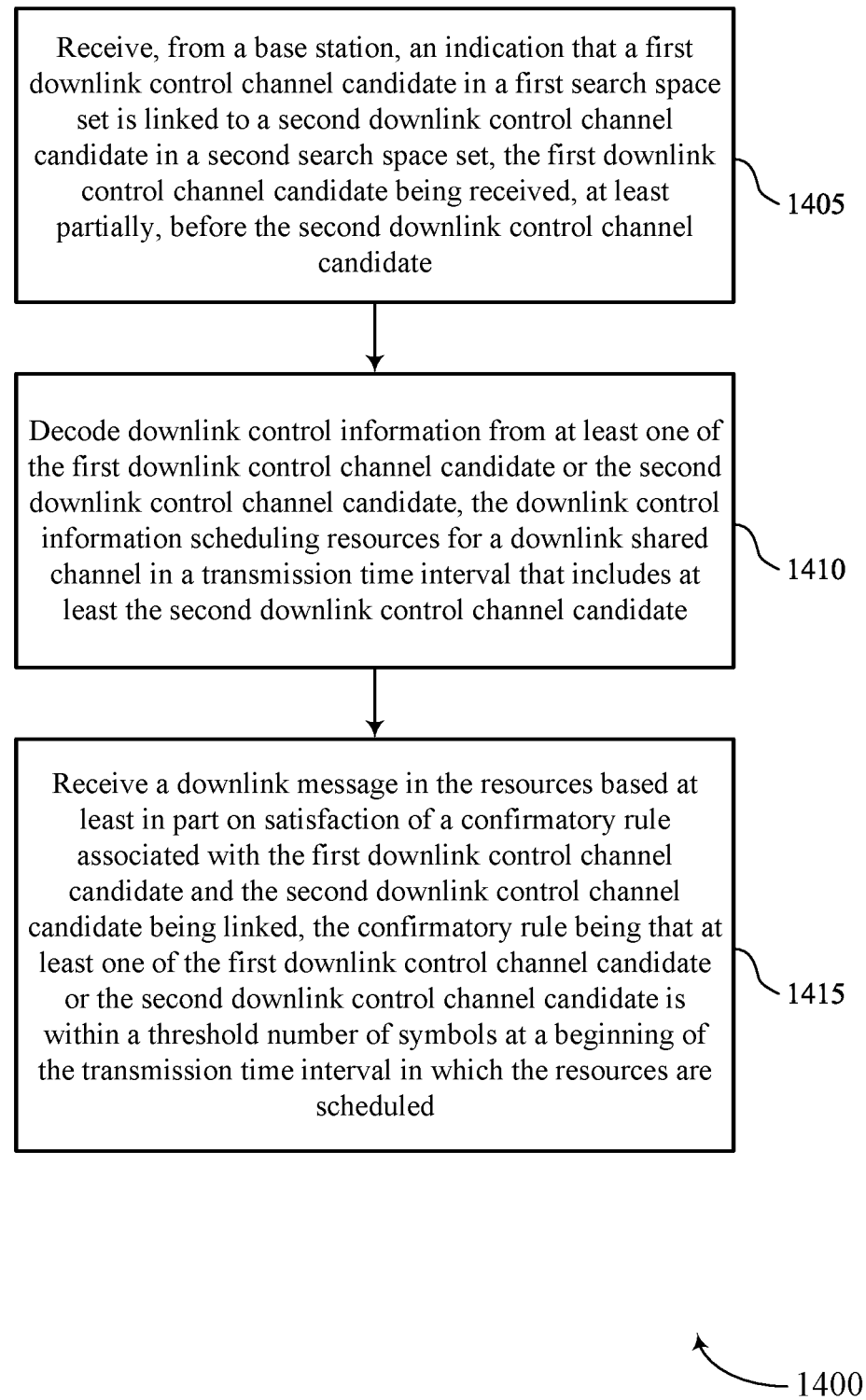
FIGS. 14 through 17 show flowcharts illustrating methods that support verifying resources associated with repetition-based linked downlink control channel candidates in accordance with aspects of the present disclosure.

FIG. 14 shows a flowchart illustrating a method 1400 that supports verifying resources associated with repetition-based linked downlink control channel candidates in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication that a first downlink control channel candidate in a first search space set is linked to a second downlink control channel candidate in a second search space set, the first downlink control channel candidate being received, at least partially, before the second downlink control channel candidate. The operations of 1405 may be performed in accordance with examples as disclosed herein. In some examples, aspects of the operations of 1405 may be performed by a PDCCH configuration interface 825 as described with reference to FIG. 8.

At 1410, the method may include decoding downlink control information from at least one of the first downlink control channel candidate or the second downlink control channel candidate, the downlink control information scheduling resources for a downlink shared channel in a transmission time interval that includes at least the second downlink control channel candidate. The operations of 1410 may be performed in accordance with examples as disclosed herein. In some examples, aspects of the operations of 1410 may be performed by a DCI decoding component 830 as described with reference to FIG. 8.

At 1415, the method may include receiving a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled. The operations of 1415 may be performed in accordance with examples as disclosed herein. In some examples, aspects of the operations of 1415 may be performed by a communication interface 835 as described with reference to FIG. 8.

Figure 15:
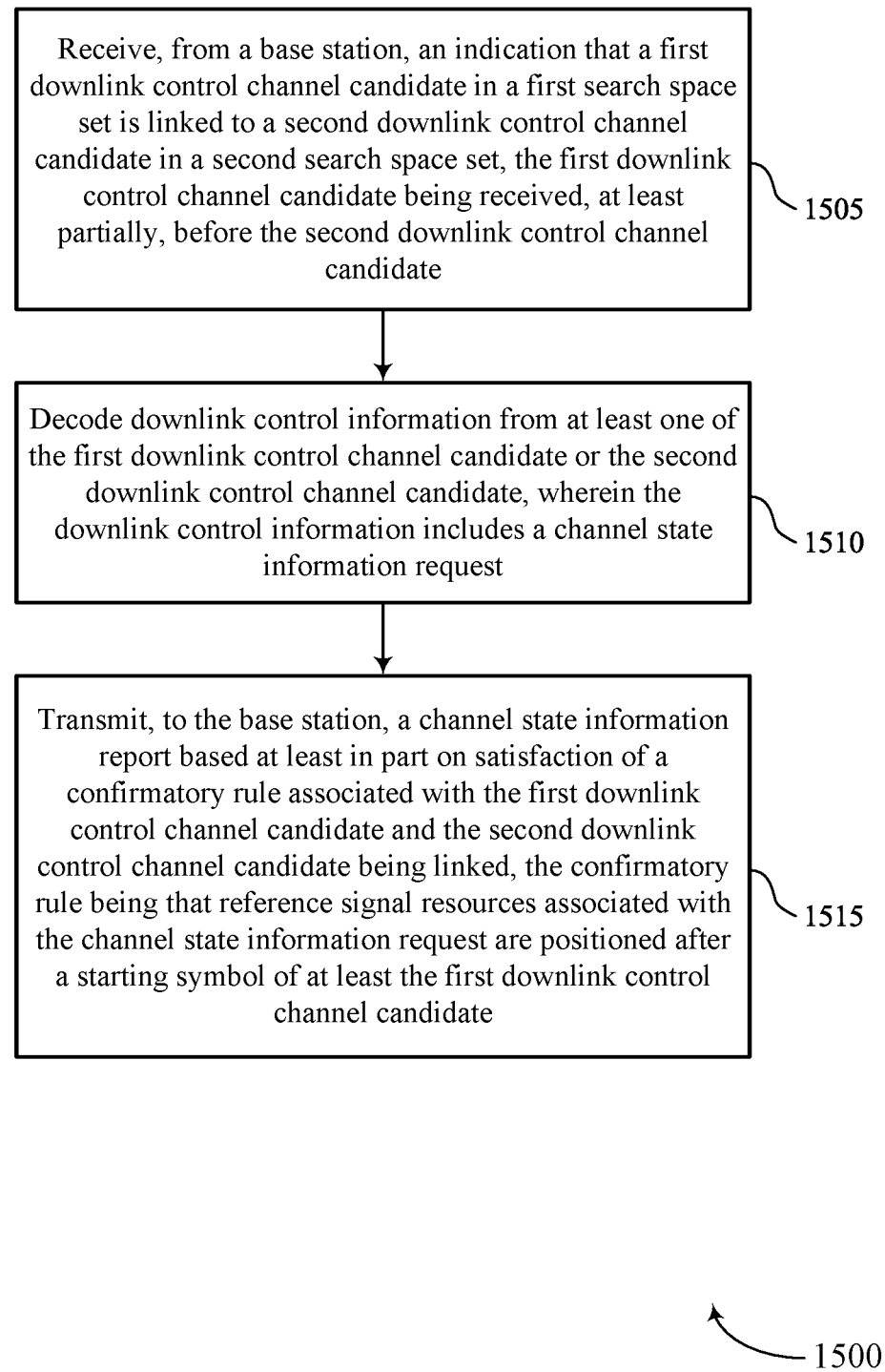

FIG. 15 shows a flowchart illustrating a method 1500 that supports verifying resources associated with repetition-based linked downlink control channel candidates in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication that a first downlink control channel candidate in a first search space set is linked to a second downlink control channel candidate in a second search space set, the first downlink control channel candidate being received, at least partially, before the second downlink control channel candidate. The operations of 1505 may be performed in accordance with examples as disclosed herein. In some examples, aspects of the operations of 1505 may be performed by a PDCCH configuration interface 825 as described with reference to FIG. 8.

At 1510, the method may include decoding downlink control information from at least one of the first downlink control channel candidate or the second downlink control channel candidate, where the downlink control information includes a channel state information request. The operations of 1510 may be performed in accordance with examples as disclosed herein. In some examples, aspects of the operations of 1510 may be performed by a DCI decoding component 830 as described with reference to FIG. 8.

At 1515, the method may include transmitting, to the base station, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate. The operations of 1515 may be performed in accordance with examples as disclosed herein. In some examples, aspects of the operations of 1515 may be performed by a communication interface 835 as described with reference to FIG. 8.

Figure 16:
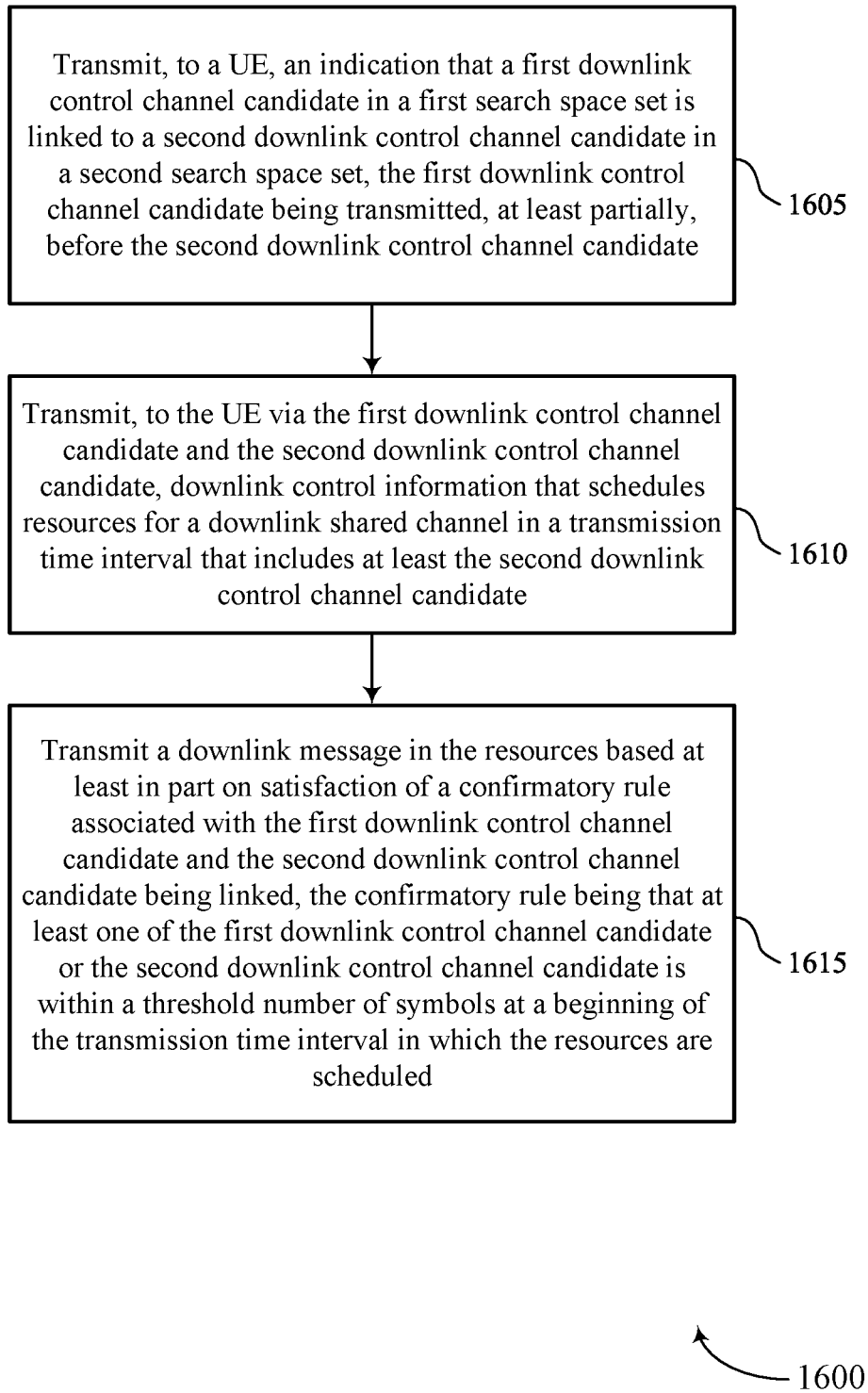

FIG. 16 shows a flowchart illustrating a method 1600 that supports verifying resources associated with repetition-based linked downlink control channel candidates in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication that a first downlink control channel candidate in a first search space set is linked to a second downlink control channel candidate in a second search space set, the first downlink control channel candidate being transmitted, at least partially, before the second downlink control channel candidate. The operations of 1605 may be performed in accordance with examples as disclosed herein. In some examples, aspects of the operations of 1605 may be performed by a PDCCH configuration interface 1225 as described with reference to FIG. 12.

At 1610, the method may include transmitting, to the UE via the first downlink control channel candidate and the second downlink control channel candidate, downlink control information that schedules resources for a downlink shared channel in a transmission time interval that includes at least the second downlink control channel candidate. The operations of 1610 may be performed in accordance with examples as disclosed herein. In some examples, aspects of the operations of 1610 may be performed by a DCI interface 1230 as described with reference to FIG. 12.

At 1615, the method may include transmitting a downlink message in the resources based on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled. The operations of 1615 may be performed in accordance with examples as disclosed herein. In some examples, aspects of the operations of 1615 may be performed by a communication interface 1235 as described with reference to FIG. 12.

Figure 17:
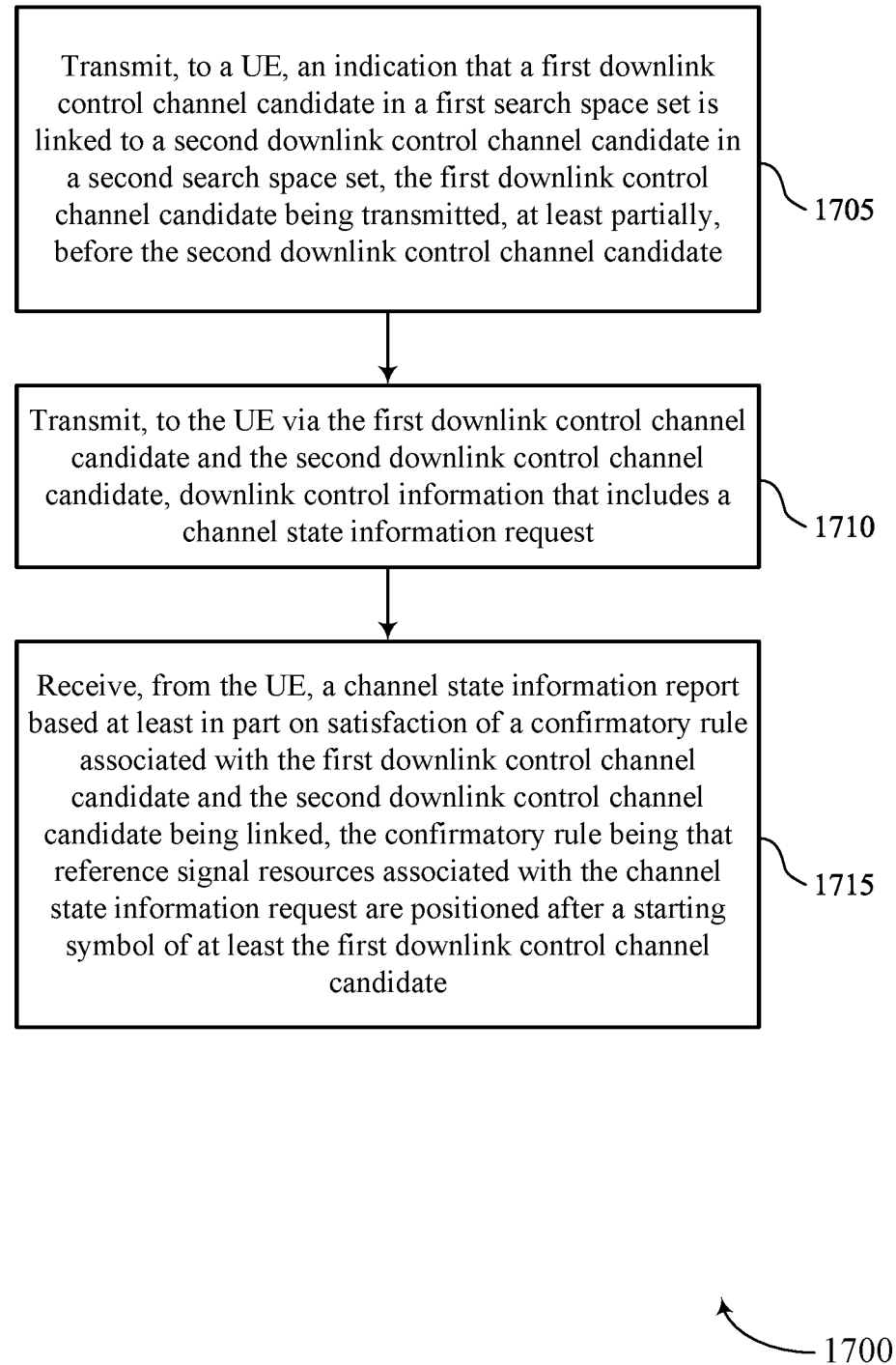

FIG. 17 shows a flowchart illustrating a method 1700 that supports verifying resources associated with repetition-based linked downlink control channel candidates in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication that a first downlink control channel candidate in a first search space set is linked to a second downlink control channel candidate in a second search space set, the first downlink control channel candidate being transmitted, at least partially, before the second downlink control channel candidate. The operations of 1705 may be performed in accordance with examples as disclosed herein. In some examples, aspects of the operations of 1705 may be performed by a PDCCH configuration interface 1225 as described with reference to FIG. 12.

At 1710, the method may include transmitting, to the UE via the first downlink control channel candidate and the second downlink control channel candidate, downlink control information that includes a channel state information request. The operations of 1710 may be performed in accordance with examples as disclosed herein. In some examples, aspects of the operations of 1710 may be performed by a DCI interface 1230 as described with reference to FIG. 12.

At 1715, the method may include receiving, from the UE, a channel state information report based on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate. The operations of 1715 may be performed in accordance with examples as disclosed herein. In some examples, aspects of the operations of 1715 may be performed by a communication interface 1235 as described with reference to FIG. 12.

The following provides an overview of aspects of the present disclosure:

Aspect 1: A method for wireless communication at a UE, comprising: receiving, from a base station, an indication that a first downlink control channel candidate in a first search space set is linked to a second downlink control channel candidate in a second search space set, the first downlink control channel candidate being received, at least partially, before the second downlink control channel candidate; decoding downlink control information from at least one of the first downlink control channel candidate or the second downlink control channel candidate, the downlink control information scheduling resources for a downlink shared channel in a transmission time interval that includes at least the second downlink control channel candidate; and receiving a downlink message in the resources based at least in part on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Aspect 2: The method of aspect 1, wherein the transmission time interval is a second transmission time interval, the method further comprising: determining that the first downlink control channel candidate is positioned within a first transmission time interval preceding the second transmission time interval including the second downlink control channel candidate and the resources; and verifying, based at least in part on determining that the first downlink control channel candidate is positioned within the first transmission time interval, that the confirmatory rule is satisfied by the second downlink control channel candidate being positioned within the threshold number of symbols of the second transmission time interval.

Aspect 3: The method of aspect 1, further comprising: determining that both the first downlink control channel candidate and the second downlink control channel candidate are positioned within the transmission time interval in which the resources are scheduled, wherein the confirmatory rule is applicable based at least in part on the first downlink control channel candidate and the second downlink control channel candidate being positioned within the transmission time interval.

Aspect 4: The method of aspect 3, wherein the verifying comprises: verifying, based at least in part on determining that both the first downlink control channel candidate and the second downlink control channel candidate are positioned within the transmission time interval, that the confirmatory rule is satisfied by both the first downlink control channel candidate and the second downlink control channel candidate being positioned within the threshold number of symbols of the transmission time interval.

Aspect 5: The method of any of aspects 3 through 4, wherein the verifying comprises: verifying, based at least in part on determining that both the first downlink control channel candidate and the second downlink control channel candidate are positioned within the transmission time interval, that the confirmatory rule is satisfied by at least one of the first downlink control channel candidate and the second downlink control channel candidate being positioned within the threshold number of symbols of the transmission time interval.

Aspect 6: The method of any of aspects 1 through 5, further comprising: determining that the downlink control information schedules the resources for the downlink shared channel with a type A resource mapping, wherein the confirmatory rule is applicable based at least in part on the downlink control information scheduling the resources with the type A resource mapping.

Aspect 7: The method of any of aspects 1 through 6, wherein receiving the indication comprises: receiving, via a radio resource control message, an indication that the first search space set and the second search space set are linked, wherein the first downlink control channel candidate and the second downlink control channel candidate are linked based at least in part on the first search space set and the second search space set being linked.

Aspect 8: The method of any of aspects 1 through 7, wherein the threshold number of symbols is three.

Aspect 9: A method for wireless communications at a UE, comprising: receiving, from a base station, an indication that a first downlink control channel candidate in a first search space set is linked to a second downlink control channel candidate in a second search space set, the first downlink control channel candidate being received, at least partially, before the second downlink control channel candidate; decoding downlink control information from at least one of the first downlink control channel candidate or the second downlink control channel candidate, wherein the downlink control information includes a channel state information request; and transmitting, to the base station, a channel state information report based at least in part on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Aspect 10: The method of aspect 9, further comprising: verifying, based at least in part on the first downlink control channel candidate and the second downlink control channel candidate being linked, that the confirmatory rule is satisfied by the reference signal resources being positioned after a starting symbol of the second downlink control channel candidate.

Aspect 11: The method of aspect 9, further comprising: verifying, based at least in part on the first downlink control channel candidate and the second downlink control channel candidate being linked and the first downlink control channel candidate being received before the second downlink control channel candidate, that the confirmatory rule is satisfied by the reference signal resources being positioned after the starting symbol of only the first downlink control channel candidate.

Aspect 12: The method of any of aspects 9 through 11, wherein receiving the indication comprises: receiving, via a radio resource control message, an indication that the first search space set and the second search space set are linked, wherein the first downlink control channel candidate and the second downlink control channel candidate are linked based at least in part on the first search space set and the second search space set being linked.

Aspect 13: The method of any of aspects 9 through 12, further comprising: determining the reference signal resources based at least in part on the channel state information request included in the downlink control information.

Aspect 14: A method for wireless communications at a base station, comprising: transmitting, to a UE, an indication that a first downlink control channel candidate in a first search space set is linked to a second downlink control channel candidate in a second search space set, the first downlink control channel candidate being transmitted, at least partially, before the second downlink control channel candidate; transmitting, to the UE via the first downlink control channel candidate and the second downlink control channel candidate, downlink control information that schedules resources for a downlink shared channel in a transmission time interval that includes at least the second downlink control channel candidate; and transmitting a downlink message in the resources based at least in part on satisfaction of a confirmatory rule associated with the first downlink control channel candidate and the second downlink control channel candidate being linked, the confirmatory rule being that at least one of the first downlink control channel candidate or the second downlink control channel candidate is within a threshold number of symbols at a beginning of the transmission time interval in which the resources are scheduled.

Aspect 15: The method of aspect 14, wherein the transmission time interval is a second transmission time interval, the method further comprising: determining that the first downlink control channel candidate is positioned within a first transmission time interval preceding the second transmission time interval including the second downlink control channel candidate and the resources; and verifying, based at least in part on determining that the first downlink control channel candidate is positioned within the first transmission time interval, that the confirmatory rule is satisfied by the second downlink control channel candidate being positioned within the threshold number of symbols of the second transmission time interval.

Aspect 16: The method of aspect 14, further comprising: determining that both the first downlink control channel candidate and the second downlink control channel candidate are positioned within the transmission time interval in which the resources are scheduled, wherein the confirmatory rule is applicable based at least in part on the first downlink control channel candidate and the second downlink control channel candidate being positioned within the transmission time interval.

Aspect 17: The method of aspect 16, wherein the verifying comprises: verifying, based at least in part on determining that both the first downlink control channel candidate and the second downlink control channel candidate are positioned within the transmission time interval, that the confirmatory rule is satisfied by both the first downlink control channel candidate and the second downlink control channel candidate being positioned within the threshold number of symbols of the transmission time interval.

Aspect 18: The method of any of aspects 16 through 17, wherein the verifying comprises: verifying, based at least in part on determining that both the first downlink control channel candidate and the second downlink control channel candidate are positioned within the transmission time interval, that the confirmatory rule is satisfied by at least one of the first downlink control channel candidate and the second downlink control channel candidate being positioned within the threshold number of symbols of the transmission time interval.

Aspect 19: The method of any of aspects 14 through 18, wherein transmitting the downlink control information comprises: transmitting the downlink control information that schedules the resources for the downlink shared channel with a type A resource mapping, wherein the confirmatory rule is applicable based at least in part on the downlink control information scheduling the resources with the type A resource mapping.

Aspect 20: The method of any of aspects 14 through 19, wherein transmitting the indication comprises: transmitting, via a radio resource control message, an indication that the first search space set and the second search space set are linked, wherein the first downlink control channel candidate and the second downlink control channel candidate are linked based at least in part on the first search space set and the second search space set being linked.

Aspect 21: The method of any of aspects 14 through 20, wherein the threshold number of symbols is three.

Aspect 22: A method for wireless communications at a base station, comprising: transmitting, to a UE, an indication that a first downlink control channel candidate in a first search space set is linked to a second downlink control channel candidate in a second search space set, the first downlink control channel candidate being transmitted, at least partially, before the second downlink control channel candidate; transmitting, to the UE via the first downlink control channel candidate and the second downlink control channel candidate, downlink control information that includes a channel state information request; and receiving, from the UE, a channel state information report based at least in part on satisfaction of a confirmatory rule associated with the first downlink control channel candidate and the second downlink control channel candidate being linked, the confirmatory rule being that reference signal resources associated with the channel state information request are positioned after a starting symbol of at least the first downlink control channel candidate.

Aspect 23: The method of aspect 22, further comprising: verifying based at least in part on the first downlink control channel candidate and the second downlink control channel candidate being linked, that the confirmatory rule is satisfied by the reference signal resources being positioned after a starting symbol of the second downlink control channel candidate.

Aspect 24: The method of aspect 22, further comprising: verifying, based at least in part on the first downlink control channel candidate and the second downlink control channel candidate being linked and the first downlink control channel candidate being transmitted before the second downlink control channel candidate, that the confirmatory rule is satisfied by the reference signal resources being positioned after the starting symbol of only the first downlink control channel candidate.

Aspect 25: The method of any of aspects 22 through 24, wherein transmitting the indication comprises: transmitting, via a radio resource control message, an indication that the first search space set and the second search space set are linked, wherein the first downlink control channel candidate and the second downlink control channel candidate are linked based at least in part on the first search space set and the second search space set being linked.

Aspect 26: The method of any of aspects 22 through 25, further comprising: indicating the reference signal resources based at least in part on the channel state information request included in the downlink control information.

Aspect 27: An apparatus for wireless communication at a UE, comprising a processor; memory coupled with the processor; and instructions stored in the memory and executable by the processor to cause the apparatus to perform a method of any of aspects 1 through 8.

Aspect 28: An apparatus for wireless communication at a UE, comprising at least one means for performing a method of any of aspects 1 through 8.

Aspect 29: A non-transitory computer-readable medium storing code for wireless communication at a UE, the code comprising instructions executable by a processor to perform a method of any of aspects 1 through 8.

Aspect 30: An apparatus for wireless communications at a UE, comprising a processor; memory coupled with the processor; and instructions stored in the memory and executable by the processor to cause the apparatus to perform a method of any of aspects 9 through 13.

Aspect 31: An apparatus for wireless communications at a UE, comprising at least one means for performing a method of any of aspects 9 through 13.

Aspect 32: A non-transitory computer-readable medium storing code for wireless communications at a UE, the code comprising instructions executable by a processor to perform a method of any of aspects 9 through 13.

Aspect 33: An apparatus for wireless communications at a base station, comprising a processor; memory coupled with the processor; and instructions stored in the memory and executable by the processor to cause the apparatus to perform a method of any of aspects 14 through 21.

Aspect 34: An apparatus for wireless communications at a base station, comprising at least one means for performing a method of any of aspects 14 through 21.

Aspect 35: A non-transitory computer-readable medium storing code for wireless communications at a base station, the code comprising instructions executable by a processor to perform a method of any of aspects 14 through 21.

Aspect 36: An apparatus for wireless communications at a base station, comprising a processor; memory coupled with the processor; and instructions stored in the memory and executable by the processor to cause the apparatus to perform a method of any of aspects 22 through 26.

Aspect 37: An apparatus for wireless communications at a base station, comprising at least one means for performing a method of any of aspects 22 through 26.

Aspect 38: A non-transitory computer-readable medium storing code for wireless communications at a base station, the code comprising instructions executable by a processor to perform a method of any of aspects 22 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, an indication that a first downlink control channel candidate in a first search space set is linked to a second downlink control channel candidate in a second search space set, the first downlink control channel candidate being received, at least partially, before the second downlink control channel candidate in a slot;
   decoding downlink control information from at least one of the first downlink control channel candidate or the second downlink control channel candidate, the downlink control information scheduling resources for a downlink shared channel in the slot that includes the first downlink control channel candidate and the second downlink control channel candidate; and
   receiving a downlink message in the resources based at least in part on satisfaction of a confirmatory rule associated with the first downlink control channel candidate and the second downlink control channel candidate being linked, the confirmatory rule being that both the first downlink control channel candidate and the second downlink control channel candidate are within three symbols at a beginning of the slot in which the resources are scheduled.

2. The method of claim 1, further comprising:
   determining that both the first downlink control channel candidate and the second downlink control channel candidate are positioned within the slot in which the resources are scheduled, wherein the confirmatory rule is applicable based at least in part on the first downlink control channel candidate and the second downlink control channel candidate being positioned within the slot.

3. The method of claim 2, further comprising:
   verifying, based at least in part on determining that both the first downlink control channel candidate and the second downlink control channel candidate are positioned within the slot, that the confirmatory rule is satisfied by both the first downlink control channel candidate and the second downlink control channel candidate being positioned within the three symbols of the slot.

4. The method of claim 2, further comprising:
   verifying, based at least in part on determining that both the first downlink control channel candidate and the second downlink control channel candidate are positioned within the slot, that the confirmatory rule is satisfied by at least one of the first downlink control channel candidate and the second downlink control channel candidate being positioned within the three symbols of the slot.

5. The method of claim 1, further comprising:
   determining that the downlink control information schedules the resources for the downlink shared channel with a type A resource mapping, wherein the confirmatory rule is applicable based at least in part on the downlink control information scheduling the resources with the type A resource mapping.

6. The method of claim 1, wherein the slot is a second slot, the method further comprising:
   determining that the first downlink control channel candidate is positioned within a first slot preceding the second slot including the second downlink control channel candidate and the resources; and
   verifying, based at least in part on determining that the first downlink control channel candidate is positioned within the first slot, that the confirmatory rule is satisfied by the second downlink control channel candidate being positioned within the three symbols of the second slot.

7. The method of claim 1, wherein receiving the indication comprises:
   receiving, via a radio resource control message, an indication that the first search space set and the second search space set are linked, wherein the first downlink control channel candidate and the second downlink control channel candidate are linked based at least in part on the first search space set and the second search space set being linked.

8. A method for wireless communications at a user equipment (UE), comprising:
   receiving, from a base station, an indication that a first downlink control channel candidate in a first search space set is linked to a second downlink control channel candidate in a second search space set, the first downlink control channel candidate being received, at least partially, before the second downlink control channel candidate in a same slot;
   decoding downlink control information from at least one of the first downlink control channel candidate or the second downlink control channel candidate, wherein the downlink control information includes a channel state information request; and transmitting, to the base station, a channel state information report based at least in part on satisfaction of a confirmatory rule associated with the first downlink control channel candidate and the second downlink control channel candidate being linked, the confirmatory rule being that reference signal resources associated with the channel state information request are positioned in the same slot as the second downlink control channel candidate and are positioned after a first starting symbol of the first downlink control channel candidate and a second starting symbol of the second downlink control channel candidate.

9. The method of claim 8, further comprising:

verifying, based at least in part on the first downlink control channel candidate and the second downlink control channel candidate being linked, that the confirmatory rule is satisfied by the reference signal resources being positioned after the second starting symbol of the second downlink control channel candidate.

10. The method of claim 8, wherein receiving the indication comprises:

receiving, via a radio resource control message, an indication that the first search space set and the second search space set are linked, wherein the first downlink control channel candidate and the second downlink control channel candidate are linked based at least in part on the first search space set and the second search space set being linked.

11. The method of claim 8, further comprising:

determining the reference signal resources based at least in part on the channel state information request included in the downlink control information.

12. A method for wireless communications at a base station, comprising:

transmitting, to a user equipment (UE), an indication that a first downlink control channel candidate in a first search space set is linked to a second downlink control channel candidate in a second search space set, the first downlink control channel candidate being transmitted, at least partially, before the second downlink control channel candidate in a slot;

transmitting, to the UE via the first downlink control channel candidate and the second downlink control channel candidate, downlink control information that schedules resources for a downlink shared channel in the slot that includes the first downlink control channel candidate and the second downlink control channel candidate; and transmitting a downlink message in the resources based at least in part on satisfaction of a confirmatory rule associated with the first downlink control channel candidate and the second downlink control channel candidate being linked, the confirmatory rule being that both the first downlink control channel candidate and the second downlink control channel candidate are within three symbols at a beginning of the slot in which the resources are scheduled.

13. The method of claim 12, further comprising:

determining that both the first downlink control channel candidate and the second downlink control channel candidate are positioned within the slot in which the resources are scheduled, wherein the confirmatory rule is applicable based at least in part on the first downlink control channel candidate and the second downlink control channel candidate being positioned within the slot.

14. The method of claim 13, further comprising:

verifying, based at least in part on determining that both the first downlink control channel candidate and the second downlink control channel candidate are positioned within the slot, that the confirmatory rule is satisfied by both the first downlink control channel candidate and the second downlink control channel candidate being positioned within the three symbols of the slot.

15. The method of claim 13, further comprising:

verifying, based at least in part on determining that both the first downlink control channel candidate and the second downlink control channel candidate are positioned within the slot, that the confirmatory rule is satisfied by at least one of the first downlink control channel candidate and the second downlink control channel candidate being positioned within the three symbols of the slot.

16. The method of claim 12, wherein transmitting the downlink control information comprises:

transmitting the downlink control information that schedules the resources for the downlink shared channel with a type A resource mapping, wherein the confirmatory rule is applicable based at least in part on the downlink control information scheduling the resources with the type A resource mapping.

17. The method of claim 12, wherein the slot is a second slot, the method further comprising:

determining that the first downlink control channel candidate is positioned within a first slot preceding the second slot including the second downlink control channel candidate and the resources; and verifying, based at least in part on determining that the first downlink control channel candidate is positioned within the first slot, that the confirmatory rule is satisfied by the second downlink control channel candidate being positioned within the three symbols of the second slot.

18. The method of claim 12, wherein transmitting the indication comprises:

transmitting, via a radio resource control message, an indication that the first search space set and the second search space set are linked, wherein the first downlink control channel candidate and the second downlink control channel candidate are linked based at least in part on the first search space set and the second search space set being linked.

19. A method for wireless communications at a base station, comprising:

transmitting, to a user equipment (UE), an indication that a first downlink control channel candidate in a first search space set is linked to a second downlink control channel candidate in a second search space set, the first downlink control channel candidate being transmitted, at least partially, before the second downlink control channel candidate in a same slot;

transmitting, to the UE via the first downlink control channel candidate and the second downlink control channel candidate, downlink control information that includes a channel state information request; and receiving, from the UE, a channel state information report based at least in part on satisfaction of a confirmatory rule associated with the first downlink control channel candidate and the second downlink control channel candidate being linked, the confirmatory rule being that reference signal resources associated with the channel state information request are positioned in the same slot as the second downlink control channel candidate and are positioned after a first starting symbol of the first downlink control channel candidate and a second starting symbol of the second downlink control channel candidate.

20. The method of claim 19, further comprising:
verifying based at least in part on the first downlink control channel candidate and the second downlink control channel candidate being linked, that the confirmatory rule is satisfied by the reference signal resources being positioned after the second starting symbol of the second downlink control channel candidate.

21. The method of claim 19, wherein transmitting the indication comprises:
transmitting, via a radio resource control message, an indication that the first search space set and the second search space set are linked, wherein the first downlink control channel candidate and the second downlink control channel candidate are linked based at least in part on the first search space set and the second search space set being linked.

22. The method of claim 19, further comprising:
indicating the reference signal resources based at least in part on the channel state information request included in the downlink control information.

23. An apparatus for wireless communication at a user equipment (UE), comprising:
one or more memories storing processor-executable code; and
one or more processors coupled with the one or more memories and operable to execute the code to cause the apparatus to:
receive, from a base station, an indication that a first downlink control channel candidate in a first search space set is linked to a second downlink control channel candidate in a second search space set, the first downlink control channel candidate being received, at least partially, before the second downlink control channel candidate in a slot;
decode downlink control information from at least one of the first downlink control channel candidate or the second downlink control channel candidate, the downlink control information scheduling resources for a downlink shared channel in the slot that includes the first downlink control channel candidate and the second downlink control channel candidate; and
receive a downlink message in the resources based at least in part on satisfaction of a confirmatory rule associated with the first downlink control channel candidate and the second downlink control channel candidate being linked, the confirmatory rule being that both the first downlink control channel candidate and the second downlink control channel candidate are within three symbols at a beginning of the slot in which the resources are scheduled.

24. The apparatus of claim 23, wherein the code is further executable by the one or more processors to cause the apparatus to:
determine that both the first downlink control channel candidate and the second downlink control channel candidate are positioned within the slot in which the resources are scheduled, wherein the confirmatory rule is applicable based at least in part on the first downlink control channel candidate and the second downlink control channel candidate being positioned within the slot.

25. The apparatus of claim 24, wherein the code is further executable by the one or more processors to cause the apparatus to:
verify, based at least in part on determining that both the first downlink control channel candidate and the second downlink control channel candidate are positioned within the slot, that the confirmatory rule is satisfied by both the first downlink control channel candidate and the second downlink control channel candidate being positioned within the three symbols of the slot.

26. The apparatus of claim 24, wherein the code is further executable by the one or more processors to cause the apparatus to:
verify, based at least in part on determining that both the first downlink control channel candidate and the second downlink control channel candidate are positioned within the slot, that the confirmatory rule is satisfied by at least one of the first downlink control channel candidate and the second downlink control channel candidate being positioned within the three symbols of the slot.

27. The apparatus of claim 23, wherein the code is further executable by the one or more processors to cause the apparatus to:
determine that the downlink control information schedules the resources for the downlink shared channel with a type A resource mapping, wherein the confirmatory rule is applicable based at least in part on the downlink control information scheduling the resources with the type A resource mapping.

28. The apparatus of claim 23, wherein the slot is a second slot, and the code is further executable by the one or more processors to cause the apparatus to:
determine that the first downlink control channel candidate is positioned within a first slot preceding the second slot including the second downlink control channel candidate and the resources; and
verify, based at least in part on determining that the first downlink control channel candidate is positioned within the first slot, that the confirmatory rule is satisfied by the second downlink control channel candidate being positioned within the three symbols of the second slot.

29. The apparatus of claim 23, wherein, to receive the indication, the code is executable by the one or more processors to cause the apparatus to:
receive, via a radio resource control message, an indication that the first search space set and the second search space set are linked, wherein the first downlink control channel candidate and the second downlink control channel candidate are linked based at least in part on the first search space set and the second search space set being linked.

30. An apparatus for wireless communications at a user equipment (UE), comprising:
one or more memories storing processor-executable code; and
one or more processors coupled with the one or more memories and operable to execute the code to cause the apparatus to:
receive, from a base station, an indication that a first downlink control channel candidate in a first search space set is linked to a second downlink control channel candidate in a second search space set, the first downlink control channel candidate being received, at least partially, before the second downlink control channel candidate in a same slot;
decode downlink control information from at least one of the first downlink control channel candidate or the second downlink control channel candidate, wherein the downlink control information includes a channel state information request; and
transmit, to the base station, a channel state information report based at least in part on satisfaction of a confirmatory rule associated with the first downlink control channel candidate and the second downlink control channel candidate being linked, the confirmatory rule being that reference signal resources associated with the channel state information request are positioned in the same slot as the second downlink control channel candidate and are positioned after a first starting symbol of the first downlink control channel candidate and a second starting symbol of the second downlink control channel candidate.

31. The apparatus of claim 30, wherein the code is further executable by the one or more processors to cause the apparatus to:
verify, based at least in part on the first downlink control channel candidate and the second downlink control channel candidate being linked, that the confirmatory rule is satisfied by the reference signal resources being positioned after the second starting symbol of the second downlink control channel candidate.

32. The apparatus of claim 30, wherein, to receive the indication, the code is executable by the one or more processors to cause the apparatus to:
receive, via a radio resource control message, an indication that the first search space set and the second search space set are linked, wherein the first downlink control channel candidate and the second downlink control channel candidate are linked based at least in part on the first search space set and the second search space set being linked.

33. The apparatus of claim 30, wherein the code is further executable by the one or more processors to cause the apparatus to:
determine the reference signal resources based at least in part on the channel state information request included in the downlink control information.

34. An apparatus for wireless communications at a base station, comprising:
one or more memories storing processor-executable code; and
one or more processors coupled with the one or more memories and operable to execute the code to cause the apparatus to:
transmit, to a user equipment (UE), an indication that a first downlink control channel candidate in a first search space set is linked to a second downlink control channel candidate in a second search space set, the first downlink control channel candidate being transmitted, at least partially, before the second downlink control channel candidate in a slot;
transmit, to the UE via the first downlink control channel candidate and the second downlink control channel candidate, downlink control information that schedules resources for a downlink shared channel in the slot that includes the first downlink control channel candidate and the second downlink control channel candidate; and
transmit a downlink message in the resources based at least in part on satisfaction of a confirmatory rule associated with the first downlink control channel candidate and the second downlink control channel candidate being linked, the confirmatory rule being that both the first downlink control channel candidate and the second downlink control channel candidate are within three symbols at a beginning of the slot in which the resources are scheduled.

35. The apparatus of claim 34, wherein the code is further executable by the one or more processors to cause the apparatus to:
determine that both the first downlink control channel candidate and the second downlink control channel candidate are positioned within the slot in which the resources are scheduled, wherein the confirmatory rule is applicable based at least in part on the first downlink control channel candidate and the second downlink control channel candidate being positioned within the slot.

36. The apparatus of claim 35, wherein the code is further executable by the one or more processors to cause the apparatus to:
verify, based at least in part on determining that both the first downlink control channel candidate and the second downlink control channel candidate are positioned within the slot, that the confirmatory rule is satisfied by both the first downlink control channel candidate and the second downlink control channel candidate being positioned within the three symbols of the slot.

37. The apparatus of claim 35, wherein the code is further executable by the one or more processors to cause the apparatus to:
verify, based at least in part on determining that both the first downlink control channel candidate and the second downlink control channel candidate are positioned within the slot, that the confirmatory rule is satisfied by at least one of the first downlink control channel candidate and the second downlink control channel candidate being positioned within the three symbols of the slot.

38. The apparatus of claim 34, wherein, to transmit the downlink control information, the code is executable by the one or more processors to cause the apparatus to:
transmit the downlink control information that schedules the resources for the downlink shared channel with a type A resource mapping, wherein the confirmatory rule is applicable based at least in part on the downlink control information scheduling the resources with the type A resource mapping.

39. The apparatus of claim 34, wherein the slot is a second slot, and the code is further executable by the one or more processors to cause the apparatus to:
determine that the first downlink control channel candidate is positioned within a first slot preceding the second slot including the second downlink control channel candidate and the resources; and
verify, based at least in part on determining that the first downlink control channel candidate is positioned within the first slot, that the confirmatory rule is satisfied by the second downlink control channel candidate being positioned within the three symbols of the second slot.

40. The apparatus of claim 34, wherein, to transmit the indication, the code is executable by the one or more processors to cause the apparatus to:

transmit, via a radio resource control message, an indication that the first search space set and the second search space set are linked, wherein the first downlink control channel candidate and the second downlink control channel candidate are linked based at least in part on the first search space set and the second search space set being linked.

41. An apparatus for wireless communications at a base station, comprising:

one or more memories storing processor-executable code; and one or more processors coupled with the one or more memories and operable to execute the code to cause the apparatus to:

transmit, to a user equipment (UE), an indication that a first downlink control channel candidate in a first search space set is linked to a second downlink control channel candidate in a second search space set, the first downlink control channel candidate being transmitted, at least partially, before the second downlink control channel candidate in a same slot;

transmit, to the UE via the first downlink control channel candidate and the second downlink control channel candidate, downlink control information that includes a channel state information request; and receive, from the UE, a channel state information report based at least in part on satisfaction of a confirmatory rule associated with the first downlink control channel candidate and the second downlink control channel candidate being linked, the confirmatory rule being that reference signal resources associated with the channel state information request are positioned in the same slot as the second downlink control channel candidate and are positioned after a first starting symbol of the first downlink control channel candidate and a second starting symbol of the second downlink control channel candidate.

42. The apparatus of claim 41, wherein the code is further executable by the one or more processors to cause the apparatus to:

verify based at least in part on the first downlink control channel candidate and the second downlink control channel candidate being linked, that the confirmatory rule is satisfied by the reference signal resources being positioned after the second starting symbol of the second downlink control channel candidate.

43. The apparatus of claim 41, wherein, to transmit the indication, the code is executable by the one or more processors to cause the apparatus to:

transmit, via a radio resource control message, an indication that the first search space set and the second search space set are linked, wherein the first downlink control channel candidate and the second downlink control channel candidate are linked based at least in part on the first search space set and the second search space set being linked.

44. The apparatus of claim 41, wherein the code is further executable by the one or more processors to cause the apparatus to:

indicate the reference signal resources based at least in part on the channel state information request included in the downlink control information.

\* \* \* \* \*